(12) United States Patent
Sasaki et al.

(10) Patent No.: US 12,455,360 B2
(45) Date of Patent: Oct. 28, 2025

(54) OBJECT DETECTOR

(71) Applicant: Murata Manufacturing Co., Ltd., Nagaokakyo (JP)

(72) Inventors: Shinichi Sasaki, Nagaokakyo (JP); Takaaki Asada, Nagaokakyo (JP); Yuuma Watabe, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 14 days.

(21) Appl. No.: 18/749,159

(22) Filed: Jun. 20, 2024

(65) Prior Publication Data

US 2024/0337739 A1     Oct. 10, 2024

Related U.S. Application Data

(63) Continuation of application No. PCT/JP2022/027044, filed on Jul. 8, 2022.

(30) Foreign Application Priority Data

Dec. 23, 2021  (JP) .................................. 2021-209481

(51) Int. Cl.
*G01S 7/54*      (2006.01)
*G01S 7/527*     (2006.01)
(Continued)

(52) U.S. Cl.
CPC ............... *G01S 7/54* (2013.01); *G01S 7/527* (2013.01); *G01S 7/536* (2013.01); *G01S 15/04* (2013.01)

(58) Field of Classification Search
CPC . G01S 7/54; G01S 7/527; G01S 7/536; G01S 15/04; G01S 7/524; G01S 7/521; G01S 15/003

See application file for complete search history.

(56) References Cited

U.S. PATENT DOCUMENTS

2012/0055250 A1*  3/2012  Hashimoto ............. G01S 7/526
                                                                      73/597
2017/0045614 A1*  2/2017  Harres .................. G01S 15/876

FOREIGN PATENT DOCUMENTS

JP       H01129181 A      5/1989
JP       2018105703 A     7/2018
(Continued)

OTHER PUBLICATIONS

International Search Report in PCT/JP2022/027044, mailed Aug. 23, 2022, 3 pages.

(Continued)

*Primary Examiner* — Omeed Alizada
(74) *Attorney, Agent, or Firm* — Keating & Bennett, LLP

(57) ABSTRACT

An object detector includes a wave transmitter to transmit a modulated wave in a predetermined frequency range to an object, a first wave receiver to receive sound waves and to generate a first wave reception signal indicative of the reception of the sound waves, a second wave receiver to receive sound waves and to generate a second wave reception signal indicative of the reception of the sound waves, an adder to generate a third wave reception signal by adding the first and second wave reception signals, and a controller to detect the object based on the third wave reception signal by causing the wave transmitter to transmit the modulated wave. The second wave receiver is farther from the wave transmitter than the first wave receiver. A fluctuation range of the third wave reception signal is not greater than a fluctuation range of the first wave reception signal.

20 Claims, 15 Drawing Sheets

(51) Int. Cl.
*G01S 7/536* (2006.01)
*G01S 15/04* (2006.01)

(56) References Cited

FOREIGN PATENT DOCUMENTS

| | | | |
|---|---|---|---|
| JP | 2020165858 A | 10/2020 | |
| WO | 2011102130 A1 | 8/2011 | |

OTHER PUBLICATIONS

Written Opinion in PCT/JP2022/027044, mailed Aug. 23, 2022, 3 pages.

* cited by examiner

OBJECT DETECTOR

CROSS REFERENCE TO RELATED APPLICATIONS

This application claims the benefit of priority to Japanese Patent Application No. 2021-209481 filed on Dec. 23, 2021 and is a Continuation Application of PCT Application No. PCT/JP2022/027044 filed on Jul. 8, 2022. The entire contents of each application are hereby incorporated herein by reference.

BACKGROUND OF THE INVENTION

1. Field of the Invention

The present invention relates to an object detector capable of detecting an object through transmission and reception of sound waves such as ultrasound.

2. Description of the Related Art

An object detector including an ultrasonic sensor for object detection is described in Japanese Unexamined Patent Application Publication No. 2018-105703, which discloses a technique to provide an object detector with enhanced object detection capability and to eliminate or reduce the possibility of unwanted detection of objects. What is referred to as "sideways jumping" in Japanese Unexamined Patent Application Publication No. 2018-105703 is a phenomenon in which a probing wave transmitted by a wave transmission sensor is received as it is by a wave reception sensor without being reflected by an object. As a measure to prevent the wave reception sensor from erroneously detecting nonexistent objects as a result of sideways jumping, the object detector described in Japanese Unexamined Patent Application Publication No. 2018-105703 forbids the wave reception sensor to receive waves for a predetermined period of time from when a command for starting transmission of probe waves is output to the wave transmission sensor.

SUMMARY OF THE INVENTION

Example embodiments of the present invention provide object detectors that are each less susceptible to incoming sound waves that are received directly by the object detector without being reflected off an object to be detected by the object detector through transmission and reception of sound waves.

An object detector according to an example embodiment of the present invention is capable of detecting an object through transmission and reception of sound waves and includes a wave transmitter to transmit a modulated wave in a predetermined frequency range to an object, a first wave receiver to receive sound waves and to generate a first wave reception signal indicative of reception of the sound waves, a second wave receiver to receive sound waves and to generate a second wave reception signal indicative of reception of the sound waves, the second wave receiver being located farther from the wave transmitter than the first wave receiver, an adder to generate a third wave reception signal by adding the first wave reception signal and the second wave reception signal, and a controller to detect the object based on the third wave reception signal by causing the wave transmitter to transmit the modulated wave, in which, with the first and second wave receivers being arranged in a predetermined layout, a fluctuation range of the third wave reception signal generated upon receipt of the modulated wave from the wave transmitter is not more than a fluctuation range of the first wave reception signal generated upon receipt of the modulated wave.

Object detectors according to example embodiments of the present invention are less susceptible to incoming sound waves that are received directly by the object detector without being reflected off an object to be detected by the object detector through transmission and reception of sound waves.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Object detectors provided as example embodiments of the present invention are described below with reference to the accompanying drawings.

The example embodiments described herein are merely examples. Partial replacements or combinations of features described in relation to the respective example embodiments are possible. Redundant description of features common to Example Embodiment 1 and other example embodiments will be omitted, and Example Embodiment 2 and other example embodiments will be described with regard to their distinctive features only. This is particularly true for similar effects. That is, not every example embodiment refers to such effects relevant to similar features.

Example Embodiment 1

The following describes the configuration and operation of an object detector according to Example Embodiment 1.
1. Configuration
1-1. Overview An overview of the object detector according to Example Embodiment 1 is described below with reference to FIG. 1.

Figure 1:
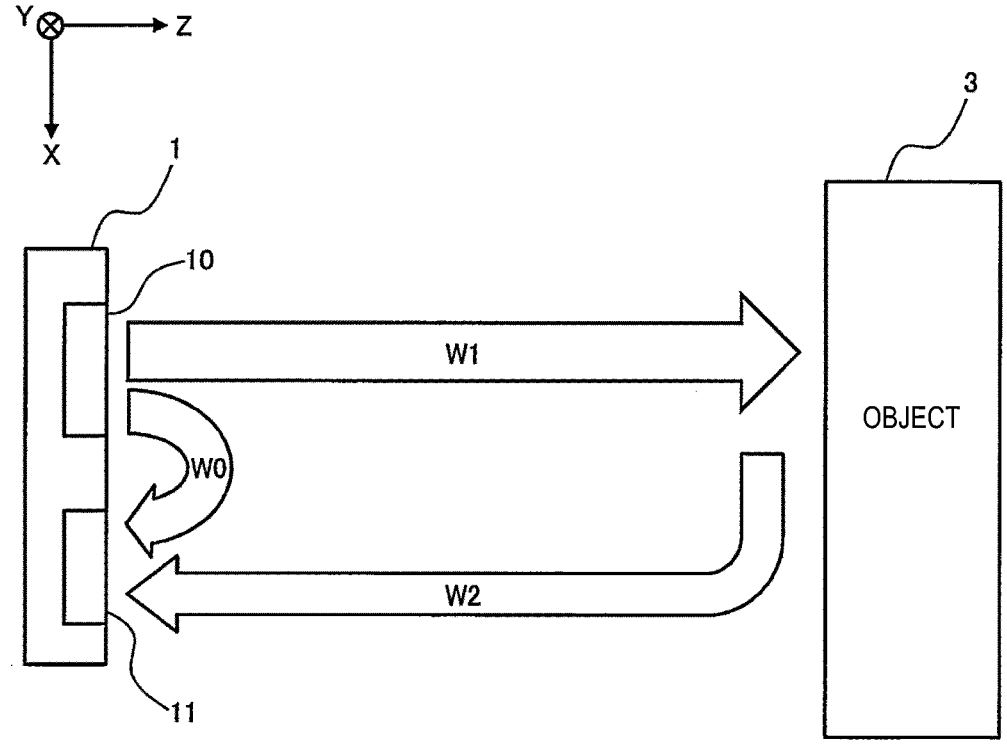
FIG. 1 illustrates an overview of an object detector according to Example Embodiment 1 of the present invention.

FIG. 1 illustrates an overview of an object detector 1 according to the present example embodiment. The object detector 1 is a device that transmits and receives sound waves such as ultrasound to determine, for example, the distance between the object detector 1 and an object 3. The direction of the distance between the object detector 1 and the object 3 to be detected is herein denoted by Z, and two directions perpendicular to the Z direction and orthogonal to each other are herein denoted by X and Y, respectively.

The object detector 1 according to the present example embodiment may be put to various uses in relation to detection of various kinds of objects, which are herein denoted by 3. For example, the object detector 1 for use on a mobile object is capable of measuring the proximity of the mobile object to the object 3 and determining the presence or absence of an obstacle or the conditions of a road surface. The object detector 1 also finds use in vital sensing and structural inspection. The object detector for use in vital sensing is capable of measuring the heart rate or the respiration rate of a living body by detecting minute displacements of various kinds of objects (the objects 3). The object detector for use in structural inspection is capable of examining wiring or steps of various kinds of products.

For example, the object detector 1 detects the object 3 in the following manner: a wave transmitter 10 of the object detector 1 transmits a chirp wave W1 to the +Z side where the object 3 is located, and wave receiver 11 of the object detector 1 receives an echo W2. The chirp wave W1 is a sound wave that is frequency modulated for the purpose of object detection. The echo W2 is a wave reflected off the object 3. At the time of object detection, a direct wave W0 is received directly by the wave receiver 11 as a result of transmission of the chirp wave W1 from the wave transmitter 10 without being reflected off the object 3. The direct wave W0 can affect the accuracy of detecting the object 3.

As a way to address this problem, the reception of the direct wave W0 is forbidden for a set period of time (see Japanese Unexamined Patent Application Publication No. 2018-105703). Unfortunately, it is not possible to receive sound waves throughout the period during which the reception of the direct wave W0 is forbidden. That is, no use can be made of the echo W2 for object detection when the direct wave W0 and the echo W2 strike on the detector at one time. For example, this approach is not suitable for an object detection method involving the use of the chirp wave W1 with a long chirp duration. Furthermore, the short-range object detection is not feasible in the period during which the reception of the direct wave W0 is forbidden.

Figure 2:
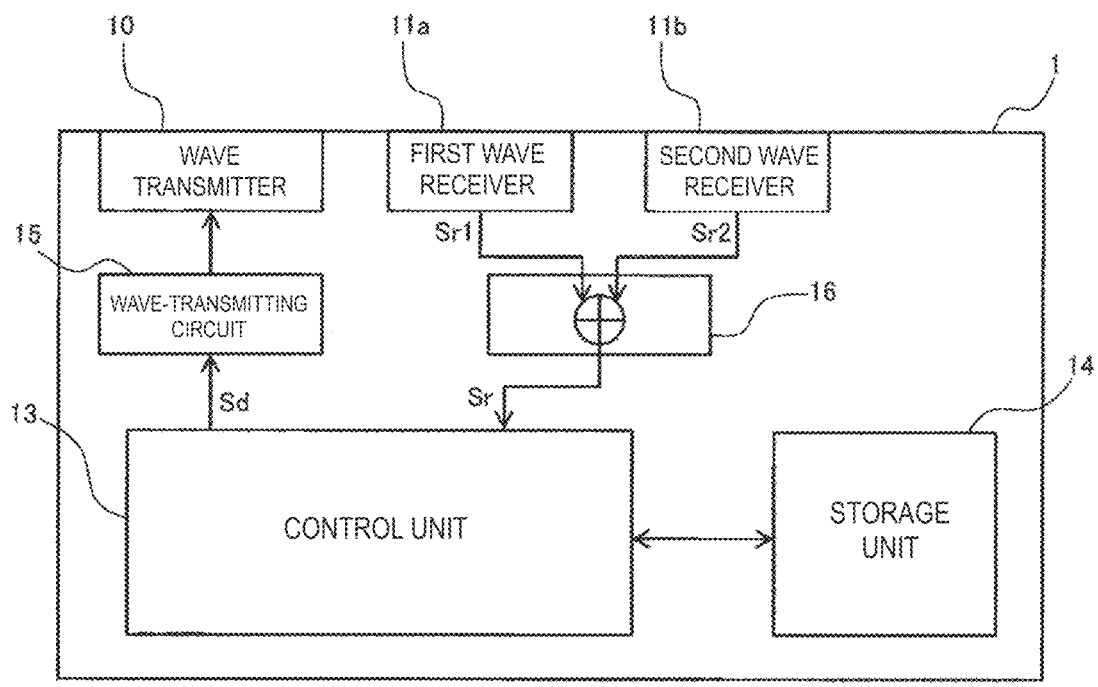
FIG. 2 is a block diagram illustrating the configuration of the object detector according to Example Embodiment 1 of the present invention.
Figure 3:
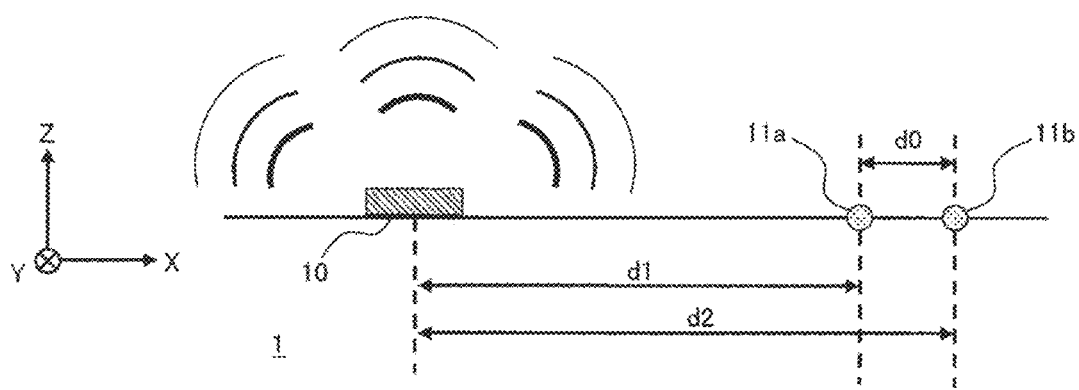
FIG. 3 illustrates an example layout of a wave transmitter and receivers of the object detector according to Example Embodiment 1 of the present invention.

The present example embodiment addresses the problem through the use of more than one wave receiver 11 without the need to forbid the reception of the direct wave W0. Although the reception of the direct wave W0 is permitted, the object detector 1 is less susceptible to the direct wave W0 in terms of its accuracy of detecting the object and can operate without the 3 aforementioned inconveniences. The following describes the configuration of the object detector 1.
1-2. Detector Configuration The configuration of the object detector 1 according to the present example embodiment is described below with reference to FIGS. 2 and 3. FIG. 2 is a block diagram illustrating the configuration of the object detector 1. FIG. 3 illustrates an example layout of the wave transmitter 10 and the wave receivers 11 of the object detector 1 according to the present example embodiment.

Referring to FIG. 2, the object detector 1 according to the present example embodiment includes the wave transmitter 10, two wave receivers (respectively denoted by 11a and 11b), a controller 13, a storage unit 14, a wave-transmitting circuit 15, and a wave-receiving circuit 16. The wave receivers 11a and 11b may be herein also collectively referred to as wave receivers 11.

For example, the wave transmitter 10, the first wave receiver 11a, and the second wave receiver 11b of the object detector 1 are arranged in sequence in the X direction as illustrated in FIG. 3. The wave transmitter 10 and the wave receivers 11 are disposed on, for example, a substrate whose main surface extends in an XY plane. In this example, d1 is greater than d2, where d1 and d2 denote the distance between the wave transmitter 10 and the first wave receiver 11a and the distance between the wave transmitter 10 and the second wave receiver 11b, respectively. The distances d1 and d2 each may be set to any value within tolerance as appropriate and may be measured as the distance between the reference positions, such as the centers of the wave transmitter 10 and each wave receiver 11.

The distance difference calculated by subtracting the distance d1 between the wave transmitter 10 and the first wave receiver 11a from the distance d2 between the wave transmitter 10 and the second wave receiver 11b is denoted by do. In the present example embodiment, the value of the distance difference do is set with a view toward making the object detector 1 less susceptible to the direct wave W0 (see FIG. 1). In other words, the first wave receiver 11a and the second wave receiver 11b are each positioned relative to the wave transmitter 10 in accordance with the distance difference do set to an optimal value. The optimization of the distance difference do in the object detector 1 according to the present example embodiment will be described later.

Referring to FIG. 3, which illustrates an example configuration of the object detector 1, the wave transmitter 10 and the two wave receivers respectively denoted by 11a and 11b are disposed on the same XY plane. This layout provides ease of positioning the first wave receiver 11a and the second wave receiver 11b at similar distances from the object 3 (see FIG. 1) on the +Z side relative to the object detector 1 and optimizing the distance difference do (calculated by subtracting the distance between the wave transmitter 10 and the first wave receiver 11a from the distance between the wave transmitter 10 and the second wave receiver 11b).

Referring back to FIG. 2, the wave transmitter 10 is, for example, a thermophone that is a sound wave source configured to generate sound waves by heating the surrounding air intermittently. The sound waves generated by the thermophone can vary in frequency in accordance with the heating cycle. The adoption of a thermophone as the wave transmitter 10 thus provides ease of generating wideband sound waves and using various types of modulation. The use of the thermophone can make the wave transmitter 10 compact and lightweight. Furthermore, the pulse width can be kept short by the adoption of the pulse-interval modulation such that the thermophone can easily control heat generation and power consumption.

Various kinds of nondirectional sound sources capable of working equally in all directions, rather than in one direction only, can be adopted as the wave transmitter 10 in the present example embodiment. Alternatively, the wave transmitter 10 may be a directional sound source with variable or fixed directivity. It is not required that the wave transmitter 10 be a thermophone. For example, the wave transmitter 10 may be a piezoelectric resonant ultrasonic transducer.

The wave transmitter 10 generates the chirp wave W1, which is a modulated wave. For example, the chirp wave W1 is an ultrasound at a frequency of 20 KHz or above. The chirp wave W1 is modulated with a predetermined frequency range. For example, the frequency of the chirp wave W1 with a predetermined chirp duration may decrease (down-chirp) gradually (e.g., linearly) over time.

A modulated wave of the wave transmitter 10 may use various modulation methods other than the one mentioned above. For example, an up-chirp or spreading codes such as m-sequence code may be used. Instead of the pulse-interval modulation, the pulse-width modulation may be adopted. In some example embodiments, amplitude modulation or any form of modulation other than frequency modulation is performed. It is not required that ultrasound be generated by the wave transmitter 10. The wave transmitter 10 may generate sound waves of various frequency ranges. It has to be ensured that the frequency range of the chirp wave W1 does not overlap the double of the frequency range concerned.

The wave-transmitting circuit 15 is a drive circuit of the wave transmitter 10. For example, the wave transmitter 10 is driven in accordance with a wave transmission signal Sd, which is input to the wave transmitter 10 by the controller 13. In the case where the wave transmitter 10 is a thermophone, the wave-transmitting circuit 15 includes, for example, a switching transistor, a capacitor, and an inductor and is configured to perform on-off control of a supply of current to the thermophone in accordance with the wave transmission signal Sd. The wave-transmitting circuit 15 may set parameters, such as frequency range, chirp duration, intensity, and directivity, of sound waves to be generated by the wave transmitter 10. All or part of the function of the wave-transmitting circuit 15 may be inextricably linked to the wave transmitter 10 or the controller 13.

The wave receiver 11 is for example a microphone, such as a micro-electro-mechanical systems (MEMS) microphone. For example, the first wave receiver 11a and the second wave receiver 11b are products of the same kind and have certain frequency characteristics in common with each other (see, for example, FIG. 9). Variations in the frequency characteristics of the wave receivers 11 are permitted as appropriate although it is required that the variations fall within tolerance.

Upon receipt of sound waves from the outside, the wave receivers 11a and 11b generate a wave reception signal Sr1 and a wave reception signal Sr2, respectively. The wave reception signals are indicative of the reception of the sound waves. It is not required that the wave receivers 11 be MEMS microphones. The wave receivers 11 each may be another microphone whose frequency characteristics are suited to receiving wideband ultrasound transmitted by the wave transmitter 10. For example, the wave receivers 11 may be condenser microphones. The wave receivers 11 may be nondirectional microphones or microphones with various types of directivity where appropriate.

The wave-receiving circuit 16 is an adder configured to add the wave reception signals Sr1 and Sr2 generated respectively by the wave receivers 11a and 11b. The wave-receiving circuit 16 generates a wave reception signal Sr, which is the sum of the wave reception signals Sr1 and Sr2 and falls within a predetermined dynamic range. The wave-receiving circuit 16 then outputs the wave reception signal Sr to the controller 13. The wave-receiving circuit 16 may include various driving circuits for the wave receivers 11. All or part of the function of the wave-receiving circuit 16 may be inextricably linked to the wave receivers 11 or the controller 13.

The controller 13 is configured or programmed to exercise overall control of the object detector 1. For example, the controller 13 may be a microcomputer that operates in cooperation with software to perform predetermined functions. The controller 13 is configured or programmed to perform various functions by executing arithmetic processing based on data and programs retrieved from the storage unit 14. For example, the controller 13 generates the wave transmission signal Sd based on the data stored in the storage unit 14 and outputs the wave transmission signal Sd to the wave-transmitting circuit 15 to cause the wave transmitter 10 to generate a chirp wave. The controller 13 is capable of performing arithmetic computations to detect the object 3 based on the wave reception signal Sr from the wave-receiving circuit 16. This will be described later.

The controller 13 may be an electronic circuit specifically designed for the predetermined functions or may be hardware circuitry including a reconfigurable electronic circuit. The controller 13 may be a semiconductor integrated circuit, such as a CPU, an MPU, a DSP, an FPGA, or an ASIC. The controller 13 may include an analog-to-digital (A/D) converter and a digital-to-analog (D/A) converter.

Figure 4:
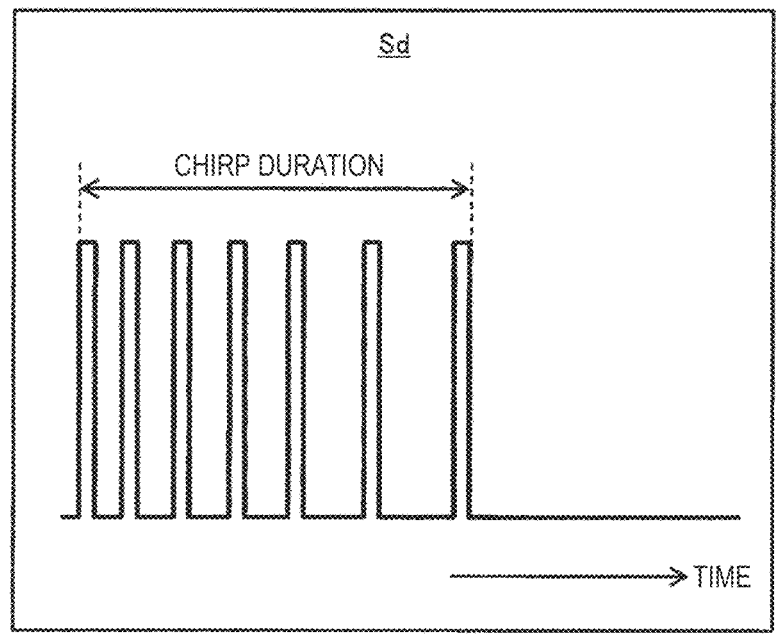
FIG. 4 illustrates a transmission signal transmitted from the object detector.

The storage unit 14 is flash memory or any other storage medium in which programs and data necessary for the functions of the controller 13 are stored. For example, data representing the wave transmission signal Sd is stored in the storage unit 14. FIG. 4 illustrates an example of the data representing the wave transmission signal Sd. More specifically, FIG. 4 illustrates an example of the pulse shape of the wave transmission signal Sd for generating the chirp wave W1 that is a down-chirp.

1-3. Functional Configuration of Controller

Figure 5:
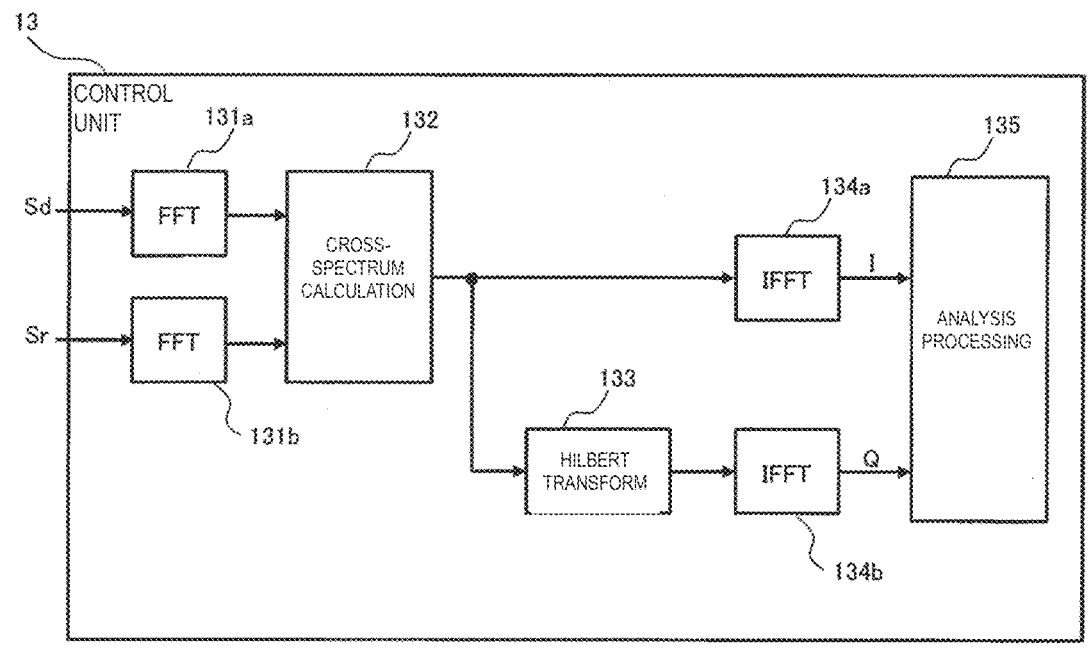
FIG. 5 is a block diagram illustrating the functional configuration of a controller of the object detector according to Example Embodiment 1 of the present invention.

The following describes arithmetic computations to be performed by the controller 13 of the object detector 1 according to the present with reference to FIG. 5.

FIG. 5 is a block diagram illustrating the functional configuration of the controller 13. The controller 13 includes functional modules, such as fast Fourier transform (FFT) modules 131a and 131b, a cross-spectrum calculation module 132, a Hilbert transform module 133, inverse fast Fourier transform (IFFT) modules 134a and 134b, and an analysis processing module 135. The FFT modules 131a and 131b may be hereinafter also collectively referred to as FFT modules 131. Likewise, the IFFT modules 134a and 134b may be hereinafter also collectively referred to as IFFT modules 134.

For example, the functional modules 131 and 135 perform signal processing when the wave transmission signal Sd from the storage unit 14 and the wave reception signal Sr from the wave-receiving circuit 16 are input to the controller 13. The functional modules 131 to 135 can operate at periodic intervals. For example, the functional modules 131 to 135 operate at a predetermined measurement frame rate (e.g., 30 frames/min), as will be described below.

A portion of the processing sequentially carried out by the functional modules 131 to 135 or, more specifically, the processing started by the FFT modules 131 and carried on by the subsequent modules up to the IFFT modules 134 is performed so that an analytic signal is generated based on the wave transmission signal Sd and the wave reception signal Sr that are input at each frame. The analytic signal is defined by the cross-correlation function between the wave transmission signal Sd and the wave reception signal Sr. The cross-correlation function describes the time-domain correlation between the wave transmission signal Sd and the wave reception signal Sr.

The FFT module 131a performs a fast Fourier transform on the wave transmission signal Sd input to the controller 13 such that the wave transmission signal Sd is transformed from the time domain to the frequency domain. The FFT module 131a then outputs the result to the cross-spectrum calculation module 132. The FFT module 131b, which operates in a manner similar to the FFT module 131a, performs a fast Fourier transform on the wave reception signal Sr input to the controller 13 and then outputs the result to the cross-spectrum calculation module 132.

The cross-spectrum calculation module 132 computes the cross spectrum based on the result of the Fourier transforms performed on the signals Sd and Sr by the respective FFT modules 131 and then outputs the result to the IFFT module 134a and the Hilbert transform module 133. The cross spectrum corresponds to the frequency component obtained through the Fourier transform performed on the cross-correlation function between the wave transmission signal Sd and the wave reception signal Sr.

Upon receipt of the cross spectrum, the IFFT module 134a performs an inverse fast Fourier transform on the cross spectrum to transform it from the frequency domain back to the time domain. The IFFT module 134a outputs the resultant signal, namely, a signal I to the analysis processing module 135. The signal I output to the analysis processing module 135 represents the cross-correlation function between the wave transmission signal Sd and the wave reception signal Sr and may be hereinafter also referred to as in-phase component I.

Upon receipt of the cross spectrum, the Hilbert transform module 133 performs a Hilbert transform on the cross spectrum. Each frequency component of the cross spectrum is shifted by $\Pi/2$ through the Hilbert transform. The Hilbert transform module 133 outputs the result to the IFFT module 134b.

The IFFT module 134b, which operates in a manner similar to the IFFT module 134a, performs arithmetic computations on the cross spectrum subjected to the Hilbert transform and then outputs the resultant signal, namely, a signal Q to the analysis processing module 135. The signal Q output to the analysis processing module 135 is in quadrature with the in-phase component I and may be hereinafter also referred to as quadrature component Q.

The analysis processing module 135 generates an analytic signal including the in-phase component I and the quadrature component Q, which are regarded as the real part and the imaginary part, respectively, of the analytic signal. The analysis processing module 135 then performs processing on the analytic signal. The analytic signal generated based on the wave transmission signal Sd and the wave reception signal Sr represents an analytic function in the complex domain (see FIG. 6).

The various functional features of the controller 13 may be implemented by the programs stored in the storage unit 14. Alternatively, all or some of the functional features may be implemented by the hardware circuitry. It is not required that the cross-correlation function be obtained through the inverse Fourier transform performed on the cross spectrum obtained through the Fourier transform. For example, the controller 13 may perform sum-of-product computations directly on the wave transmission signal Sd and the wave reception signal Sr. The controller 13 may include an FPGA or any other circuit that performs sum-of-product computations. It is not required that the analytic signal be generated through the Hilbert transform. For example, the controller 13 may perform quadrature detection to generate an analytic signal.

2. Operation

The following describes the operation of the object detector 1 configured as described above.

The object detector 1 according to the present example embodiment sequentially conducts per-frame measurements, each of which involves transmission of the chirp wave W1 and reception of the echo W2 of the chirp wave W1. For example, the wave transmitter 10 transmits the chirp wave W1, which is a unitary wave corresponding to the data of the wave transmission signal Sd illustrated in FIG. 5. The wave receivers 11 then receive the echo W2. The controller 13 of the object detector 1 causes the functional modules 131 to 135 to perform arithmetic computations for each measurement frame. The correlation between the wave transmission signal Sd and the wave reception signal Sr is then analyzed for each frame, and an analytic signal representing the result of the analysis is generated.

Figure 6:
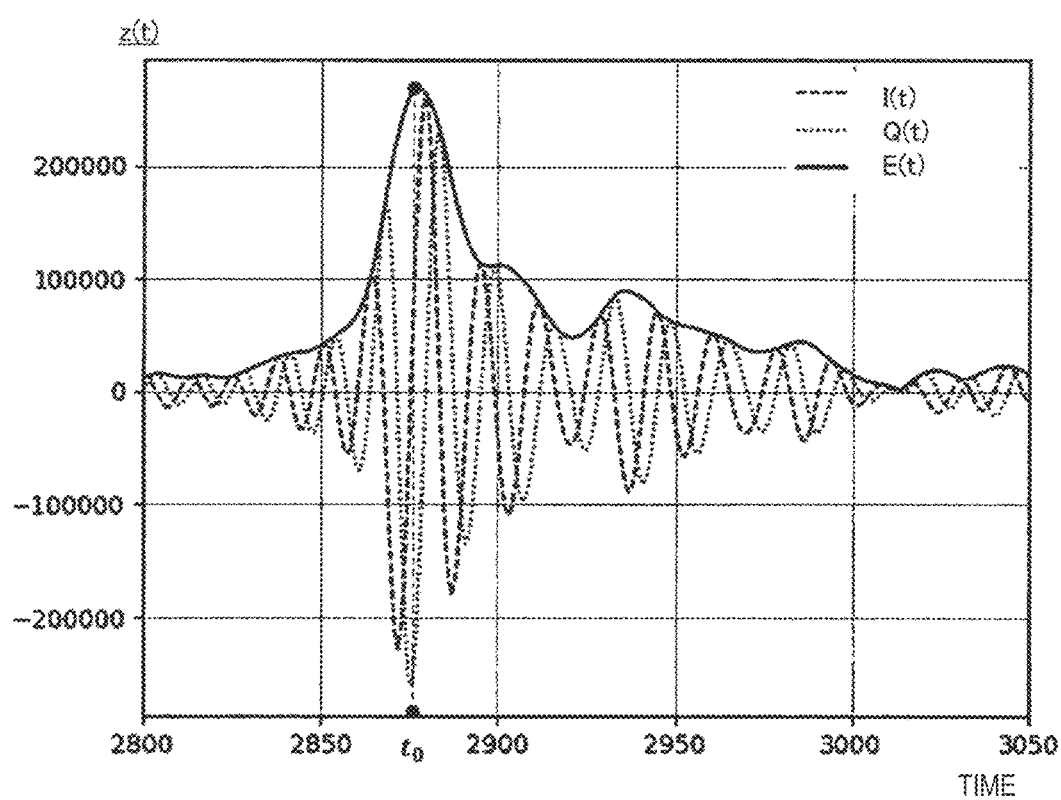
FIG. 6 is a graph illustrating an analytic signal generated in the object detector.

FIG. 6 is a graph for describing an analytic signal z(t) in the object detector 1. FIG. 6 illustrates an example of the analytic signal z(t) corresponding to one frame. The values of the analytic signal z(t) belong to the domain of complex numbers including a real part and an imaginary part. The real part is the in-phase component I(t) representing the cross-correlation function between the wave transmission signal Sd and the wave reception signal Sr, and the imaginary part is the quadrature component Q(t).

The object detector 1 obtains the envelope of the analytic signal z(t) to determine the peak time, which is denoted by to. The envelope can be expressed as $E(t)=|z(t)|$. The amplitude $|z(t)|$ of the analytic signal z(t) corresponding to one frame is at its maximum at the peak time to. The chirp wave W1 transmitted and received in this frame is analyzed to determine the moment at which the chirp wave W1 is reflected off the object 3. This enables the assessment of the propagation time required for the chirp wave W1 to be received as the echo W2 after being reflected off the object 3.

As a result of conducting the analysis, the object detector 1 can accurately determine the distance from the object 3 based on the propagation time of the echo W2 reflected off the object 3. In addition to obtaining the envelope E(t) of the analytic signal z(t) defined as a complex-valued cross-correlation function, the object detector 1 may analyze the phase z(t) of the analytic signal z(t). For example, the object detector 1 may calculate the phase difference between consecutive frames. Accordingly, minute displacements of the object 3 can be detected with high accuracy.

2-1. Influence of Direct Wave

Figure 7A:
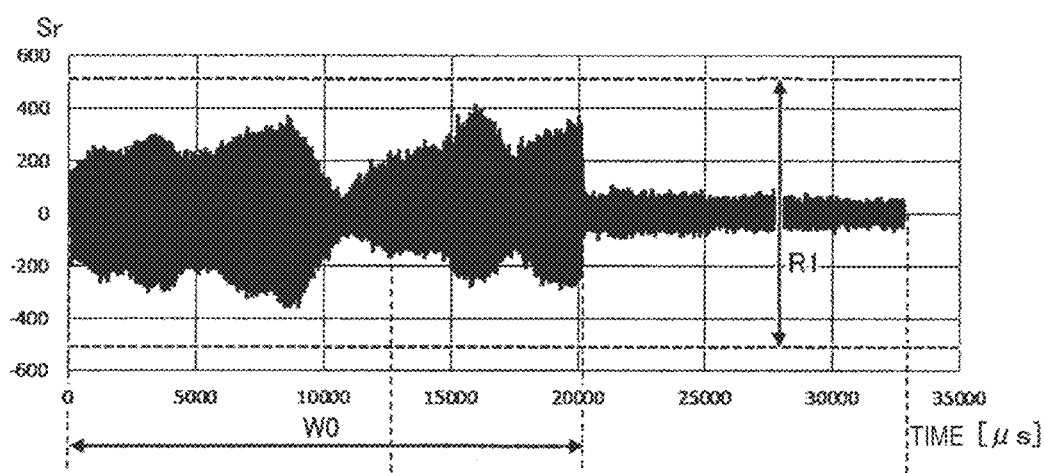
FIGS. 7A and 7B are graphs illustrating experimental results obtained by effecting the operation of the object detector according to Example Embodiment 1 of the present invention.
Figure 7B:
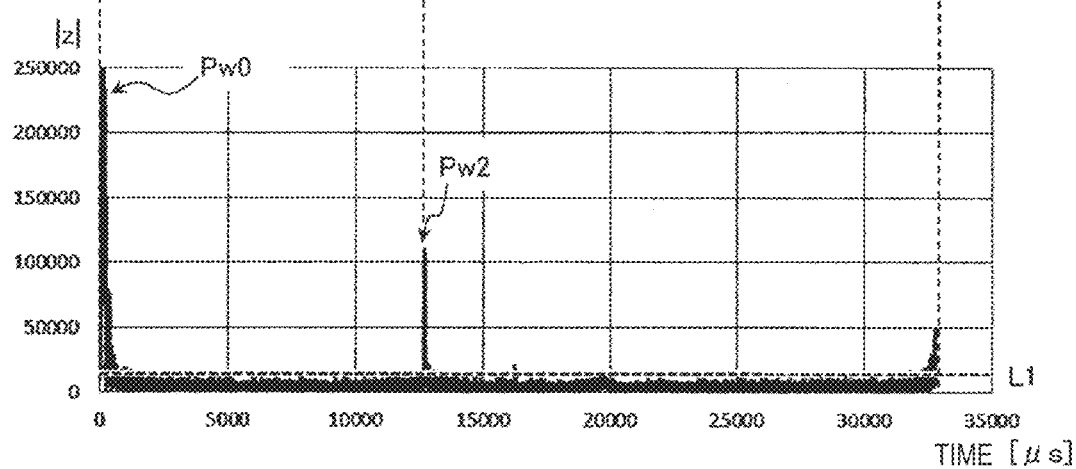

FIGS. 7A and 7B are graphs illustrating experimental results obtained by using the object detector 1 according to the present example embodiment. FIGS. 7A and 7B illustrate the results of a measurement experiment aimed at detecting the object 3 that was at a 2.2-meter distance from the wave transmitter 10 and the wave receivers 11 of the object detector 1. The chirp wave W1 was set to a broad frequency range of 40 kHz to 80 kHz, for example.

FIG. 7A illustrates an example of the waveform of the wave reception signal Sr analyzed by the object detector 1 according to the present example embodiment. FIG. 7B illustrates an example of the waveform obtained through the analysis of the wave reception signal Sr in FIG. 7A or, more specifically, the waveform of the envelope of the analytic signal z(t) defined by the cross-correlation function, where the envelope is expressed as $E(t)=|z(t)|$.

The object detector 1 according to the present example embodiment is configured to transmit and receive the chirp wave W1 that is a wideband frequency-modulated wave. The correlation between the wave transmission signal Sd and the wave reception signal Sr is analyzed throughout the chirp duration in each frame so that the distance from the object 3 can be determined. The object detector 1 is thus capable of detecting objects with high accuracy. The wave receivers 11 are designed to keep receiving waves for a relatively long period of time so that the echo W2 reflected off the object 3 can be received over the chirp duration for the purpose of object detection.

As illustrated in FIGS. 7A and 7B, there may be an overlap between the reception range of the direct wave W0 and the range of the echo reflected off the object 3. This means that the prohibition of the reception of the direct wave W1 and the exclusion of the reception range of the direct wave W0 from the scope of the analysis of the wave reception signal Sr are each less feasible as a measure to counter the direct wave W1 with a view toward such high-accuracy object detection.

FIG. 7A illustrates an example of the wave reception signal Sr corresponding to FIG. 7B and analyzed by the object detector 1 according to the present example embodiment. Although the example of the wave reception signal Sr includes some of the components of the direct wave W0, the amplitude of the wave reception signal Sr falls within R1, which denotes the dynamic range of the wave-receiving circuit 16. This is due to the layout of the wave receivers 11 in the present example embodiment.

Despite the overlap between the reception range of the direct wave W0 and the reception range of the echo W2 reflected off the object 3, Pw0 and Pw2 are obtained independently of each other through the analysis of the cross-correlation as illustrated in FIG. 7B. Pw0 denotes the peak time of the direct wave W0, and Pw2 denotes the peak time of the echo W2 reflected off the object 3. The object detector 1 according to the present example embodiment can thus detect the object 3 with high accuracy, irrespective of the reception of the direct wave W0.

Figure 8A:
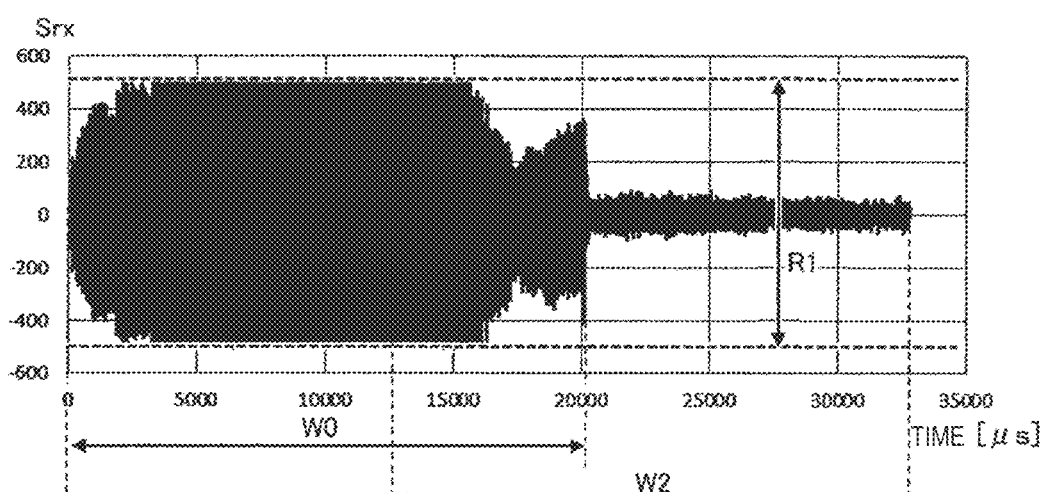
FIGS. 8A and 8B are graphs illustrating experimental results obtained under the influence of a direct wave.
Figure 8B:
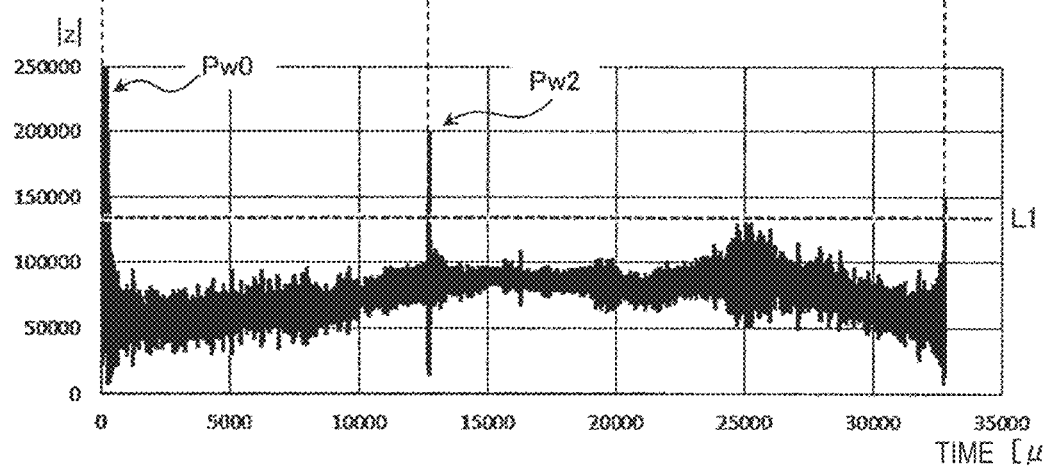

FIGS. 8A and 8B illustrate cases in which the accuracy of object detection is impaired by the direct wave W0. FIG. 8A illustrates an example of the waveform of a wave reception signal Srx under the influence of the direct wave W0. FIG. 8B illustrates an example of the waveform obtained through the analysis of the wave reception signal Srx in FIG. 8A.

Referring to FIG. 8A, the waveform of the wave reception signal Srx is clipped due to the influence of the direct wave W0. Clipping occurs when the amplitude of the waveform exceeds the dynamic range R1 of the wave-receiving circuit or the wave receivers due to the influence of the direct wave W0. The clipped waveform does not accurately represent the wave reception signal Srx. The result of the analysis of the cross-correlation is illustrated in FIG. 8B. The noise level denoted by L1 is higher in FIG. 8B than in FIG. 7B. That is, there is degradation in signal-to-noise ratio. This makes it difficult to detect objects with high accuracy.

As a way to address this problem, the distance difference do mentioned above in relation to the first wave receiver 11a and the second wave receiver 11b of the object detector 1 according to the present example embodiment is optimized to offset the direct wave W0 without the occurrence of clipping in the wave-receiving circuit 16 in which the wave reception signal Sr1 from the first wave receiver 11a and the wave reception signal Sr2 from the second wave receiver 11b are added. This eliminates or reduces the possibility that the signal-to-noise ratio will degrade due to the influence of the direct wave W0. Accordingly, the object detection is less affected by the direct wave W0.

2-2. Optimization of Distance Difference

The optimization of the distance difference do mentioned above in relation to the wave receivers 11a and 11b of the object detector 1 according to the present example embodiment is described below with reference to FIGS. 9 to 22.

Figure 9:
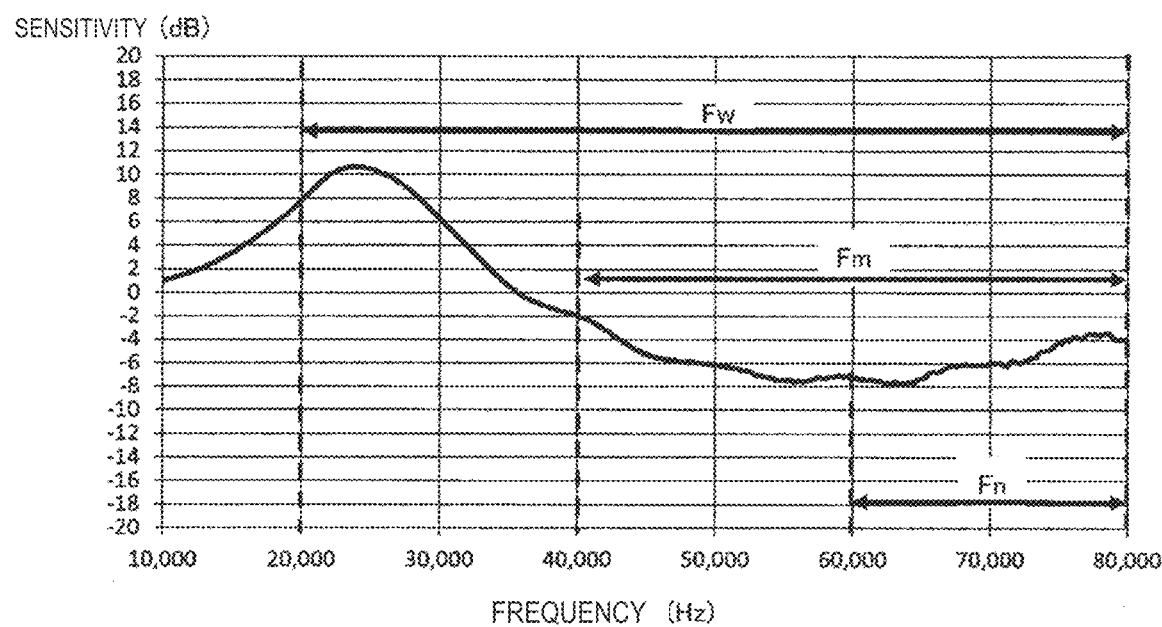
FIG. 9 illustrates an example of the frequency characteristics of the wave receivers of the object detector.

FIG. 9 illustrates an example of the frequency characteristics of the wave receivers 11 of the object detector 1. The frequency characteristics of the wave receiver 11 illustrated in this example were exhibited by a microphone (SPU0410LR5H) manufactured by Knowles Corp. The horizontal axis and the vertical axis in FIG. 9 represent the frequency and the sensitivity, respectively.

Fm, Fn, and Fw in FIG. 9 denote three different frequency ranges of the chirp wave W1. Fm denotes a first frequency range that is a frequency range of 40 kHz to 80 kHz, for example. Fn denotes a second frequency range that is a frequency range of 60 kHz to 80 KHz, for example. Fw denotes a third frequency range that is a frequency range of 20 kHz to 80 kHz, for example. As far as the frequency characteristics in FIG. 9 are concerned, the sensitivity at 60 kHz is lower than the sensitivity at 80 KHz.

The object detector 1 according to the present example embodiment uses the chirp wave W1 with broad frequency ranges such as the first and second frequency ranges denoted by Fm, Fn, and Fw. When an attempt to reduce the influence of the direct wave W0 is made with consideration given to the phase difference at one frequency, a certain frequency component can become unaffected by the direct wave W0; however, it would be difficult to offset the direct wave W0 for the other frequency components. This problem is addressed by the present example embodiment, in which the distance difference do is optimized to enable the wave receivers 11a and 11b to counter the direct wave W0 while consideration is also given to the fact that the wave receivers 11 each exhibit frequency characteristics specific to the respective frequency ranges of the chirp wave W1 as illustrated in FIG. 9. This involves the use of the waveform of a signal generated at the time when one of the wave receivers 11 receives only the direct wave W0 as a result of the transmission of the chirp wave W1.

Figure 10:
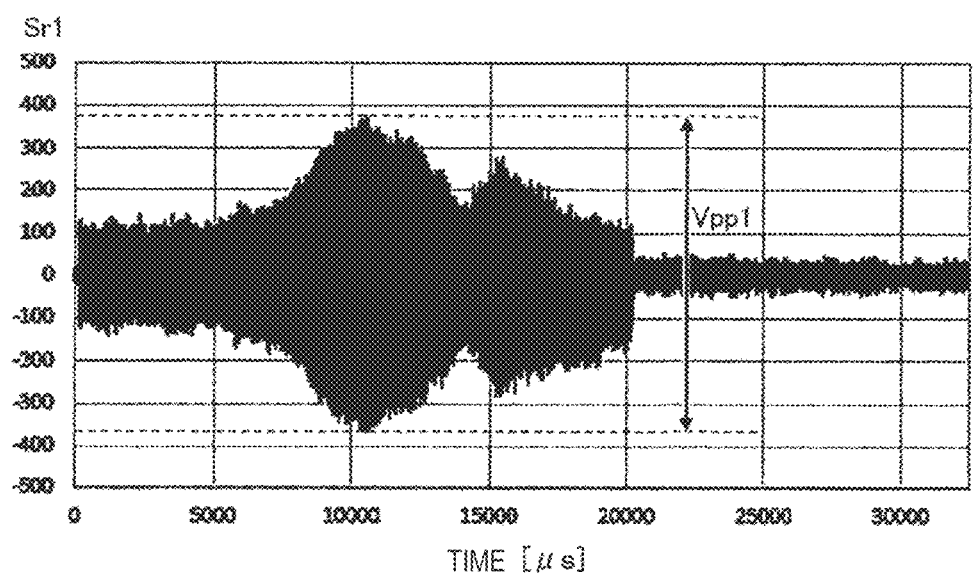
FIG. 10 illustrates an example of the waveform of a wave reception signal generated in the object detector at the time when a direct wave in a first frequency range is received.

FIG. 10 illustrates an example of the wave reception signal Sr1 generated at the time when the direct wave W0 in the first frequency range Fm is received. The horizontal axis of the graph in FIG. 10 represents time, and the vertical axis of the graph represents the signal level of the wave reception signal Sr1. Referring to FIG. 10, the chirp wave W1 in the first frequency range Fm is a down-chirp, and the direct wave W0 resulting from transmission of the chirp wave W1 is received by the first wave receiver 11a having the frequency characteristics illustrated in FIG. 9.

As illustrated in FIG. 10, amplitude fluctuations, namely, undulations in wave reception signal Sr1 are observed. The undulations of the wave reception signal Sr1 are due to the characteristics of the first wave receiver 11a. The signal waveform can be made flatter through the use of a microphone with a broader frequency range and stable frequency characteristics. The waveform of the wave reception signal Sr2 of the second wave receiver 11b can be equated with a waveform obtained by shifting the waveform of the wave reception signal Sr1 of the first wave receiver 11a by a time duration corresponding to the distance difference d0. The time duration is hereinafter referred to as shift time Δt.

Figure 11:
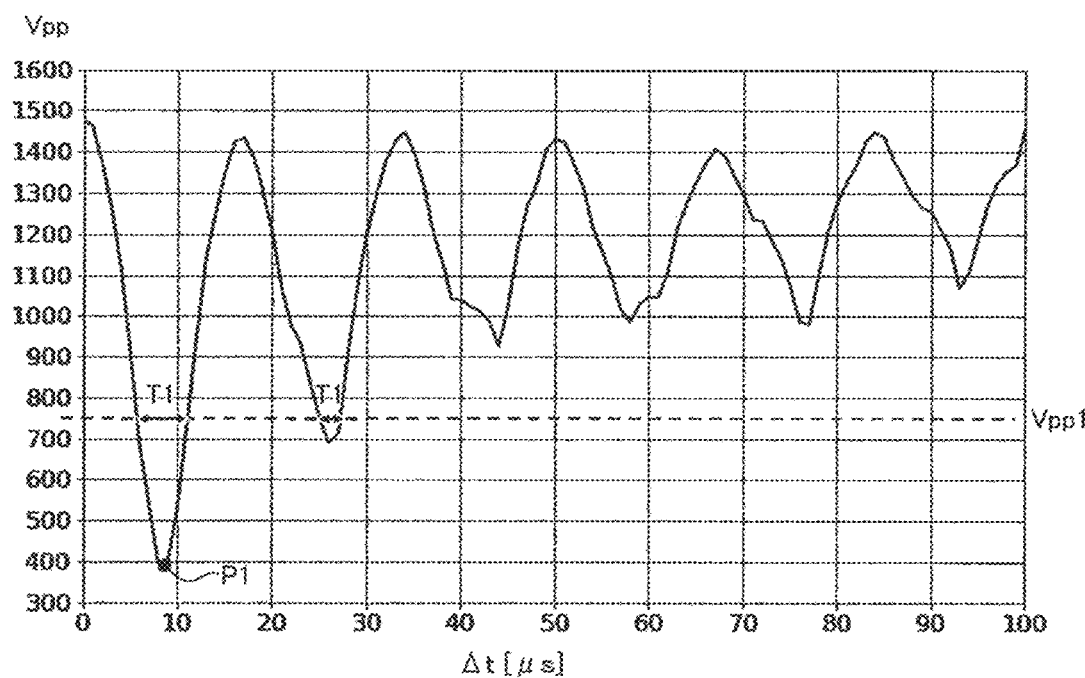
FIG. 11 illustrates the relationship between the shift time and the fluctuation range of the signal obtained by addition based on the wave reception signal in FIG. 10.

In the present example embodiment, the optimization is performed with a focus on the difference between the maximum signal level and the minimum signal level of the wave reception signal Sr1 generated upon receipt of the direct wave W0. Referring to FIG. 10, the difference, namely, the fluctuation range is denoted by Vpp1. More specifically, a fluctuation range Vpp is extracted from the waveform of the wave reception signal Sr that is the sum of the wave reception signal Sr1 in FIG. 10 and a waveform obtained by shifting the wave reception signal Sr1 by the shift time Δt. FIG. 11 illustrates the calculation results with varying shift time Δt.

FIG. 11 illustrates the relationship between the shift time Δt and the fluctuation range Vpp of the wave reception signal Sr obtained by the addition based on the wave reception signal Sr1 in FIG. 10. For example, the fluctuation range Vpp of the wave reception signal Sr obtained by addition for Δt=0 is twice the fluctuation range Vpp1 of the wave reception signal Sr1 prior to the addition. As can be seen from FIG. 11, the fluctuation range Vpp of the wave reception signal Sr obtained by addition changes with the shift time Δt in an approximately cyclical manner.

While the fluctuation range Vpp of the signal obtained by addition changes with the shift time Δt in a cyclical manner as illustrated in FIG. 11, there is more than one time period (denoted by T1) in which the fluctuation range Vpp is not more than the fluctuation range Vpp1 of the signal prior to the addition. The influence of the direct wave W0 (i.e., the possibility of occurrence of clipping) during each time period T1 can be reduced to a greater extent through the use of the wave receivers 11a and 11b than would be possible with one receiver 11. In the present example embodiment, the shift time Δt within the time period T1 is selected in the course of optimization, and the distance difference do corresponding to the selected shift time Δt is given as a result of the optimization. The acoustic velocity may be used as appropriate for the conversion of the shift time Δt into the distance difference do.

Figure 12:
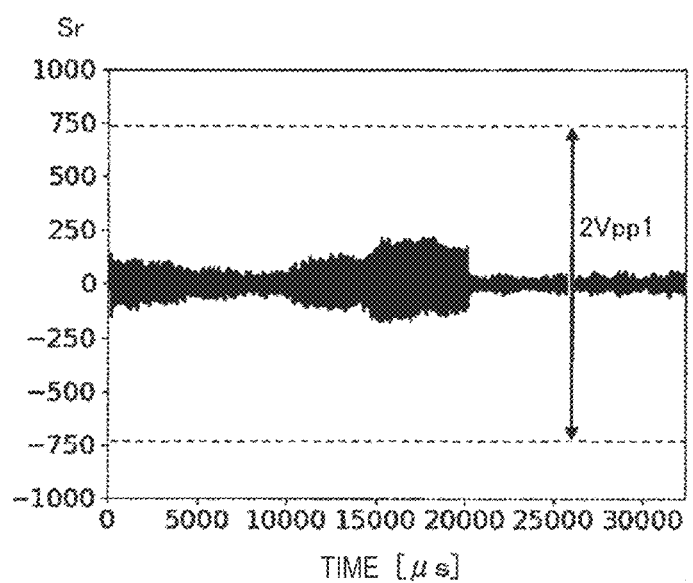
FIG. 12 is a graph illustrating the waveform of a wave reception signal obtained by addition performed in relation to the shift time at which the fluctuation range in FIG. 11 is reduced or minimized.

As can be seen from FIG. 11, P1 denotes the minimum peak of the fluctuation range Vpp of the wave reception signal Sr obtained by addition. FIG. 12 illustrates the wave reception signal Sr obtained by addition performed for the case in which the minimum peak P1 is reached when the shift time Δt is about 9 µs, for example. The wave reception signal Sr obtained by addition can be influenced to the least extent possible by the direct wave W0 when the distance difference do is set to a value into which the shift time Δt specified as above is converted. With the distance difference do being minimized, the object detector 1 can be made compact in size. Furthermore, the phase shift in the range in the direction of detection of the object 3 is reduced or minimized such that the directivity in the direction of detection can be widened.

The distance difference do in the object detector 1 does not necessarily take on the value that corresponds to the shift time Δt in FIG. 11 in a strict sense. The object detector 1 can produce the aforementioned effects when the distance difference do is set to a value within tolerance as appropriate. For example, the distance difference do in the object detector 1 may be set to a value corresponding to the shift time Δt in the time period T1 shorter than the other time period(s) T1. It is not required that the fluctuation range Vpp1 of the wave reception signal Sr1 and the fluctuation range Vpp of the reception signal Sr be defined strictly by the maximum values and the minimum values of the wave reception signals Sr1 and Sr2 generated upon receipt of the direct wave W0. The fluctuation ranges Vpp1 and Vpp each may be set to any value within tolerance as appropriate.

Figure 13:
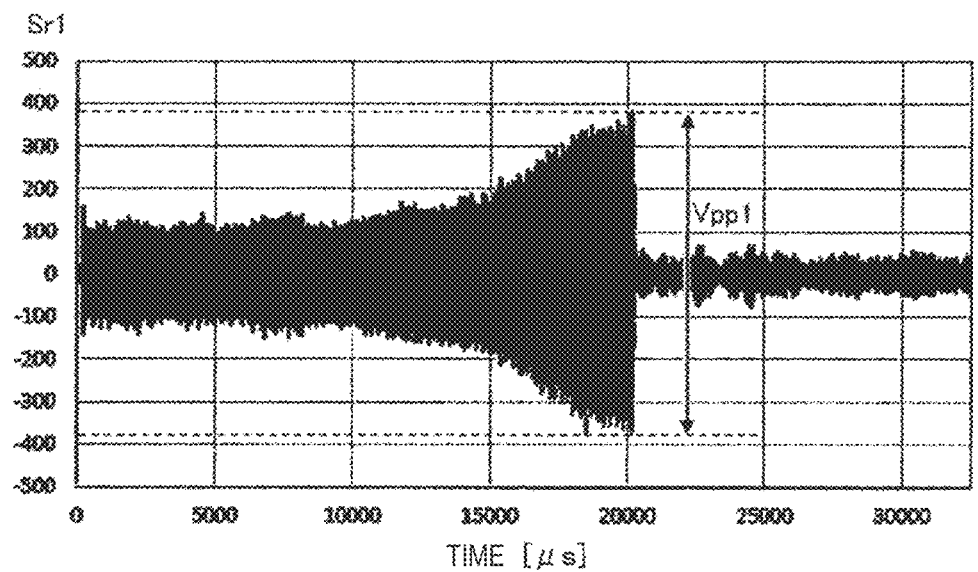
FIG. 13 illustrates an example of the waveform of a wave reception signal generated in the object detector at the time when a direct wave in a second frequency range is received.
Figure 14:
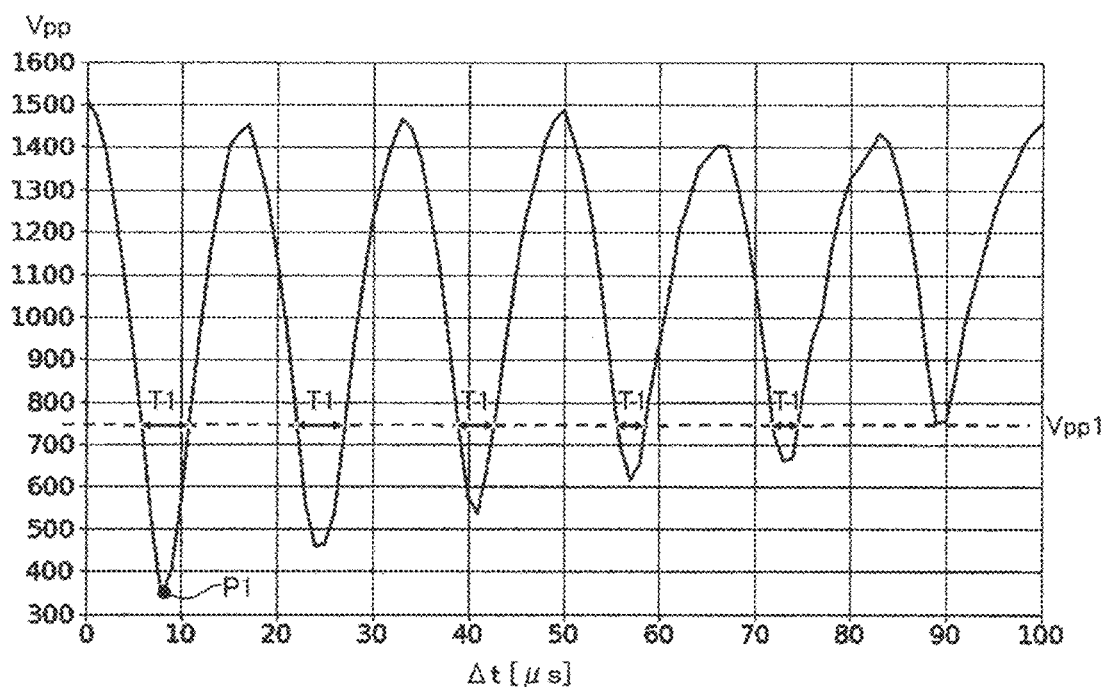
FIG. 14 illustrates the relationship between the shift time and the fluctuation range of a signal obtained by addition based on the wave reception signal in FIG. 13.

FIG. 13, which is analogous to FIG. 10, illustrates an example of the wave reception signal Sr1 generated at the time when the direct wave W0 in the second frequency range Fn is received. FIG. 14, which is analogous to FIG. 11, illustrates the relationship between the shift time Δt and the fluctuation range Vpp of the signal obtained by the addition based on the wave reception signal Sr1 in FIG. 13.

This example involves the use of a narrower frequency range or, more specifically, the second frequency range Fn for the chirp wave W1. With regard to the shift time Δt, the number of time periods T1 in which the fluctuation range Vpp of the signal obtained by addition is not more than the fluctuation range Vpp1 of the signal prior to the addition is greater in FIG. 14 than in FIG. 11. This offers the wave receivers 11a and 11b a greater flexibility in the layout that is conducive to reducing the influence of the direct wave W0. The shift time Δt at which the fluctuation range Vpp of the wave reception signal Sr obtained by addition is reduced or minimized is the same as the one in the example illustrated in FIG. 11.

Figure 15:
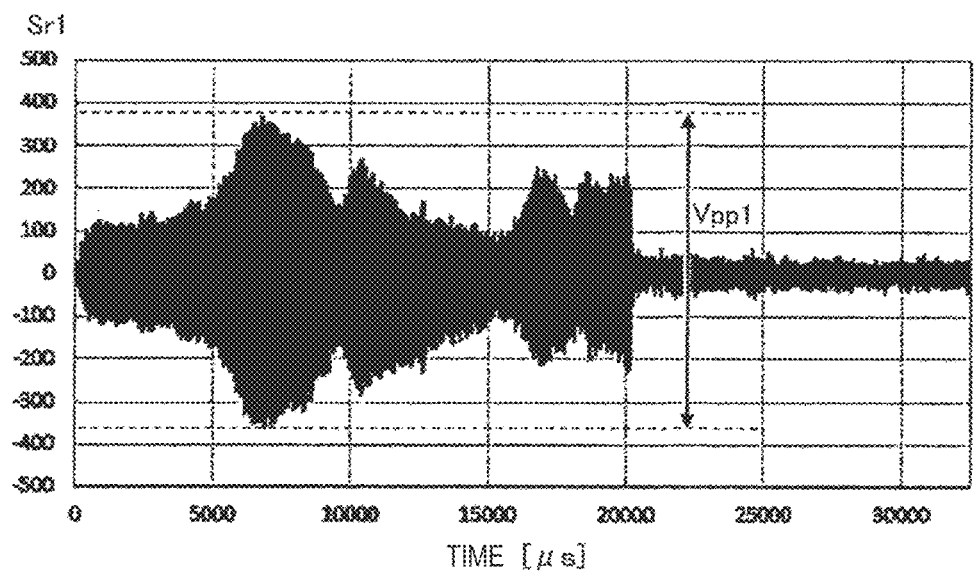
FIG. 15 illustrates an example of the waveform of a wave reception signal generated in the object detector at the time when a direct wave in a third frequency range is received.
Figure 16:
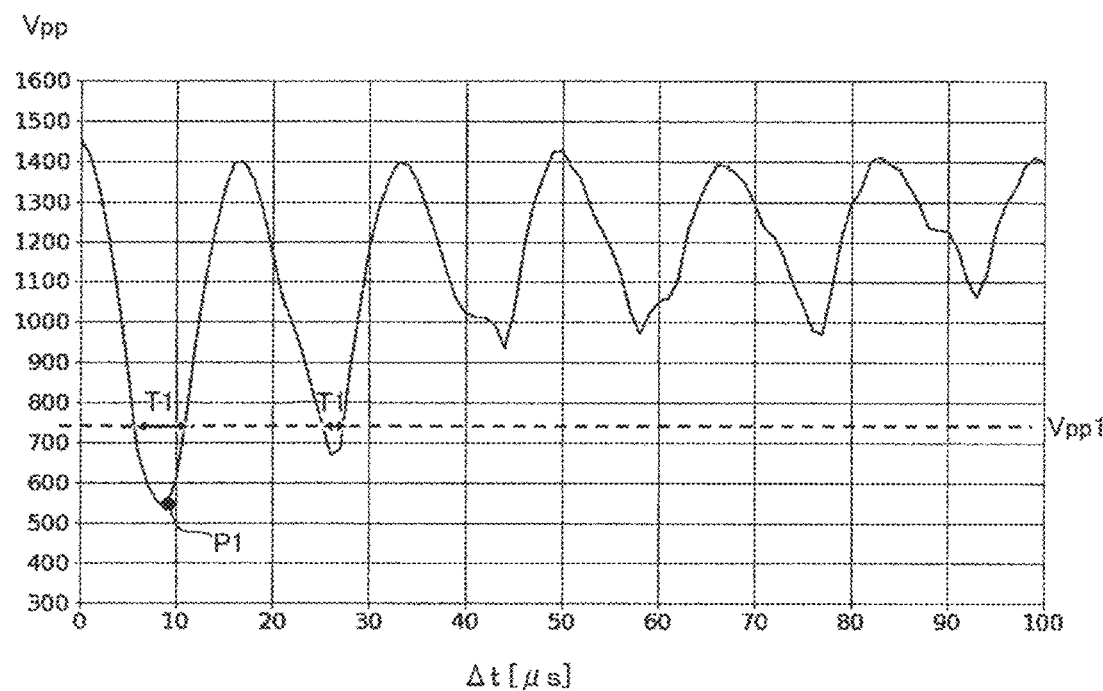
FIG. 16 illustrates the relationship between the shift time and the fluctuation range of a signal obtained by addition based on the wave reception signal in FIG. 15.

FIG. 15, which is analogous to FIG. 10, illustrates an example of the wave reception signal Sr1 generated at the time when the direct wave W0 in the third frequency range Fn is received. FIG. 16, which is analogous to FIG. 11, illustrates the relationship between the shift time Δt and the fluctuation range Vpp of the signal obtained by the addition based on the wave reception signal Sr1 in FIG. 13.

From the viewpoint of offsetting the direct wave W0, the first frequency range Fm or the second frequency range Fn is preferably selected as the frequency range of the chirp wave W1; that is, the minimum value of the frequency range of the chirp wave W1 is preferably greater than or equal to one-half of the maximum value of the frequency range concerned. In some cases, however, the minimum value of the frequency range of the chirp wave W1 is less than one-half of the maximum value of the frequency range concerned. In a case where the third frequency range Fw is selected, there are time periods (concerning the shift time Δt and denoted by T1) in which the fluctuation range Vpp of the signal obtained by addition is not more than the fluctuation range Vpp1 of the signal prior to the addition (see FIG. 16). The shift time Δt at which the fluctuation range Vpp of the wave reception signal Sr obtained by addition is reduced or minimized is the same as the one in the example illustrated in FIG. 11.

Figure 17:
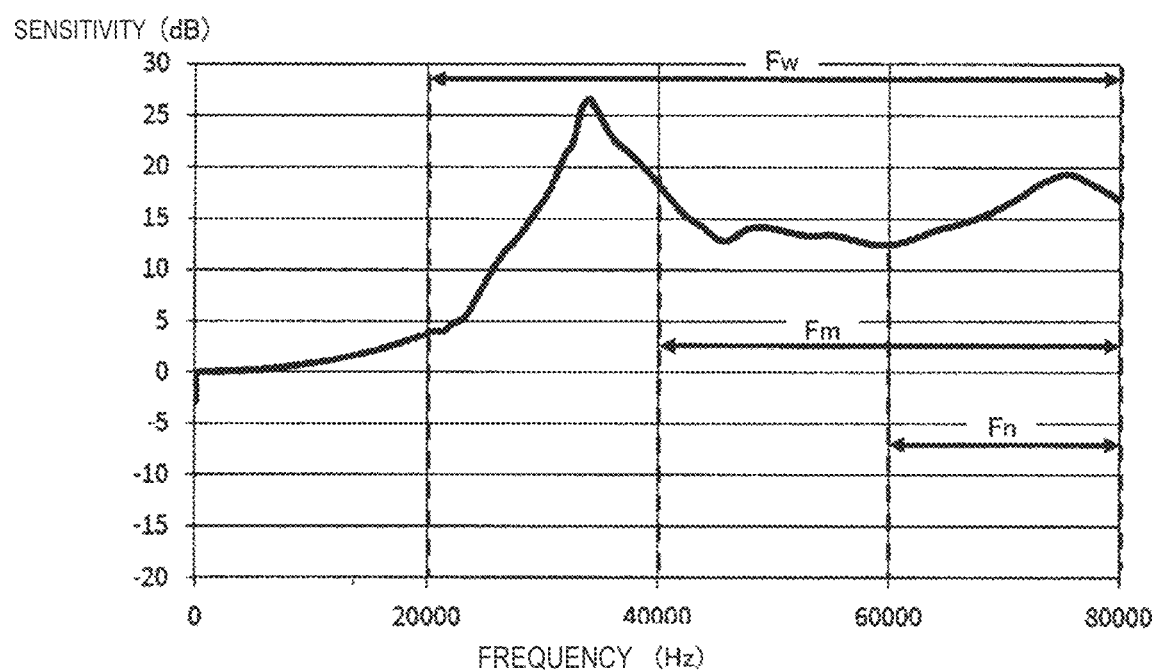
FIG. 17 illustrates another example of the frequency characteristics of the wave receivers of the object detector.

The optimization of the distance difference do described above in relation to the wave receivers 11 of the object detector 1 according to the present example embodiment is adaptable to wave receivers of varying frequency characteristics. FIG. 17 illustrates another example of the frequency characteristics of the wave receivers 11 of the object detector 1. The frequency characteristics of the wave receiver 11 illustrated in this example were exhibited by a microphone (IM73A135V01) manufactured by Infineon Technologies AG.

Figure 18:
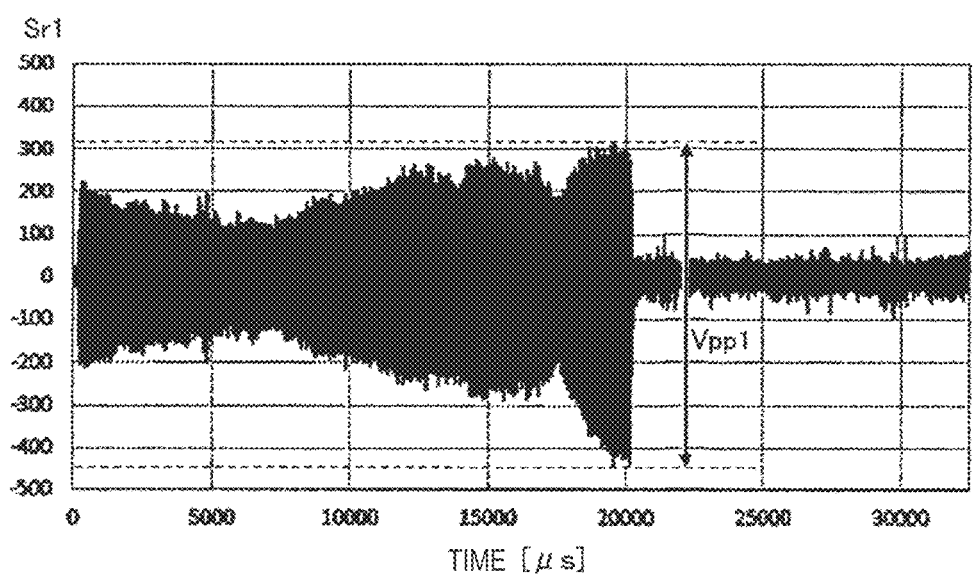
FIG. 18 illustrates another example of the waveform of the wave reception signal generated in the object detector at the time when the direct wave in the first frequency range is received.
Figure 19:
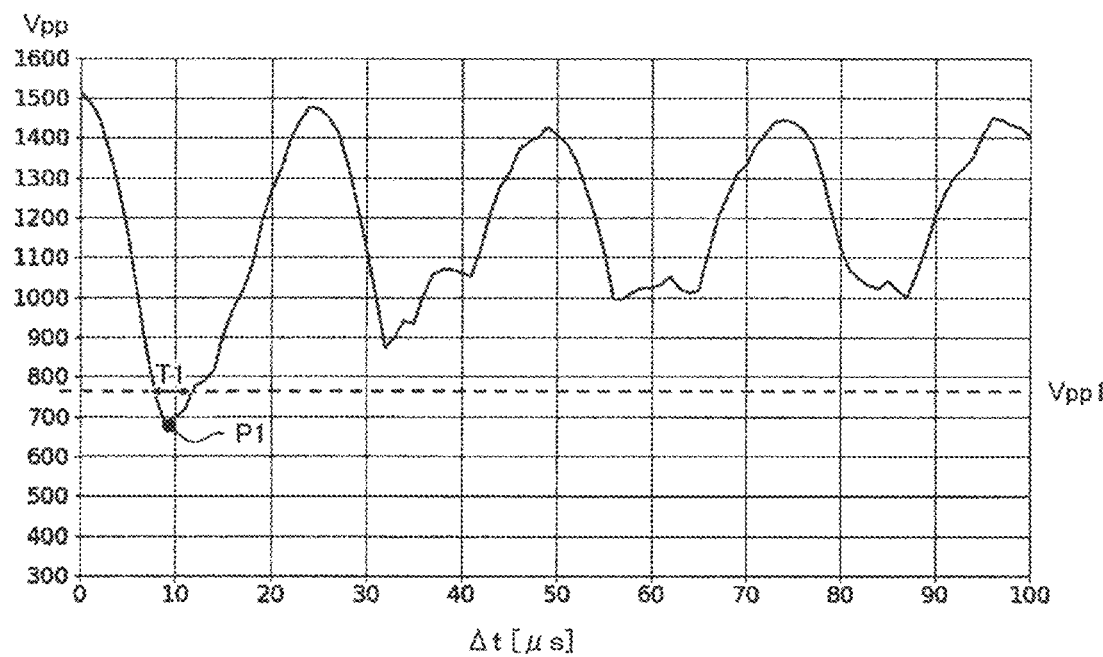
FIG. 19 illustrates the relationship between the shift time and the fluctuation range of a signal obtained by addition based on the wave reception signal in FIG. 18.

FIG. 18, which is analogous to FIG. 10, illustrates an example of the wave reception signal Sr1 generated at the time when the direct wave W0 in the first frequency range Fm is received by the wave receiver whose frequency characteristics are as illustrated in FIG. 17. FIG. 19, which is analogous to FIG. 11, illustrates the relationship between the shift time Δt and the fluctuation range Vpp of the signal obtained by the addition based on the wave reception signal Sr1 in FIG. 18.

The pattern of undulations in the wave reception signal Sr1 in FIG. 18 based on the frequency characteristics illustrated in FIG. 17 is different from the pattern in FIG. 10 based on the frequency characteristics illustrated in FIG. 9. Accordingly, the pattern of changes in the fluctuation range Vpp in FIG. 19 is different from the pattern in FIG. 11 given that the fluctuation range Vpp of the wave reception signal Sr obtained by the addition based the signal generated upon receipt of the direct wave W0 changes with the shift time Δt.

Referring to FIG. 19, there is one time period (denoted by T1) in which the fluctuation range Vpp of the signal obtained by addition is not more than the fluctuation range Vpp1 of the wave reception signal Sr1 received by one of the wave receivers 11. The minimum peak P1 of the fluctuation range Vpp is reached when the shift time Δt is about 10 μs, for example. In this case as well, the distance difference do in the object detector 1 can be optimized in accordance with the frequency characteristics of the wave reception signal Sr through the adoption of the optimization method based on the shift time Δt selected with a focus on the fluctuation range Vpp of the signal obtained by addition.

Figure 20:
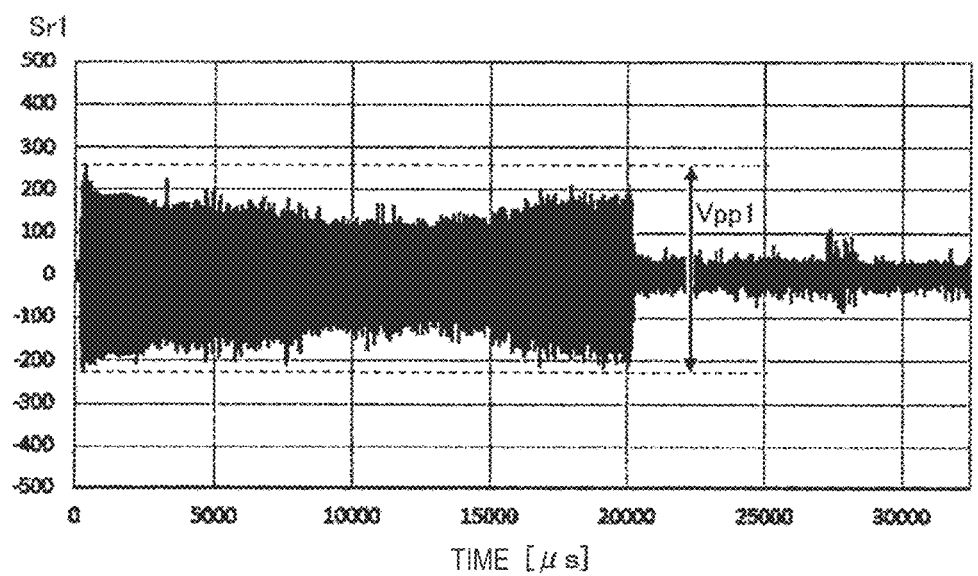
FIG. 20 illustrates another example of the waveform of the wave reception signal generated in the object detector at the time when the direct wave in the second frequency range is received.
Figure 21:
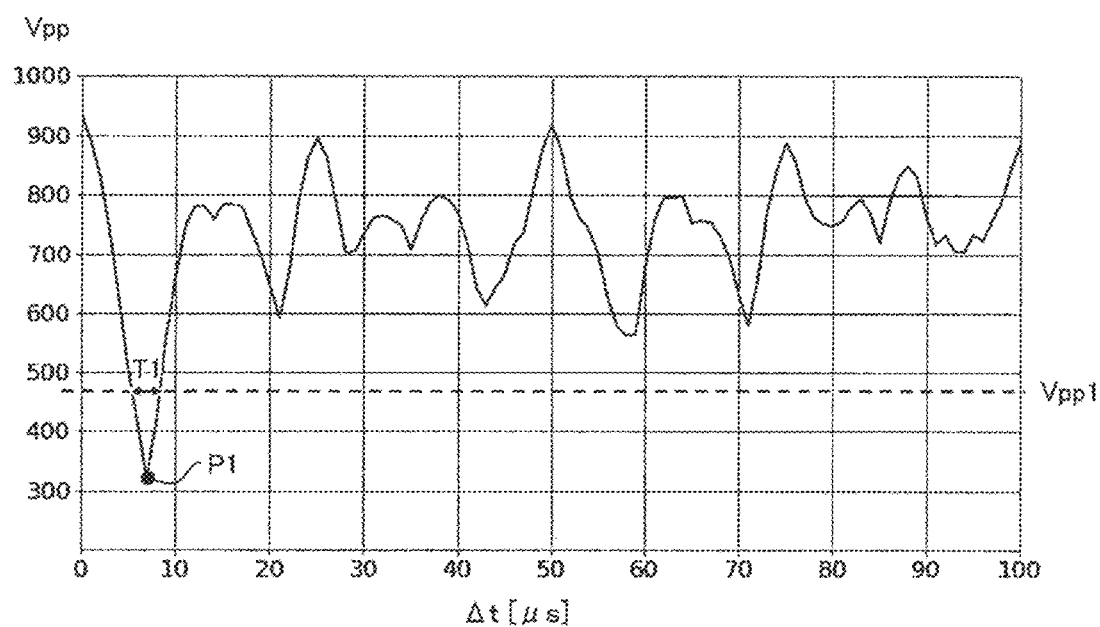
FIG. 21 illustrates the relationship between the shift time and the fluctuation range of a signal obtained by addition based on the wave reception signal in FIG. 20.

FIG. 20, which is analogous to FIG. 13, illustrates an example of the wave reception signal Sr1 generated at the time when the direct wave W0 in the second frequency range Fn is received by the wave receiver whose frequency characteristics are as illustrated in FIG. 17. FIG. 21, which is analogous to FIG. 14, illustrates the relationship between the shift time Δt and the fluctuation range Vpp of the signal obtained by the addition based on the wave reception signal Sr1 in FIG. 20. In this case, the minimum peak P1 is reached when the shift time Δt is about 8 μs, for example.

Figure 22:
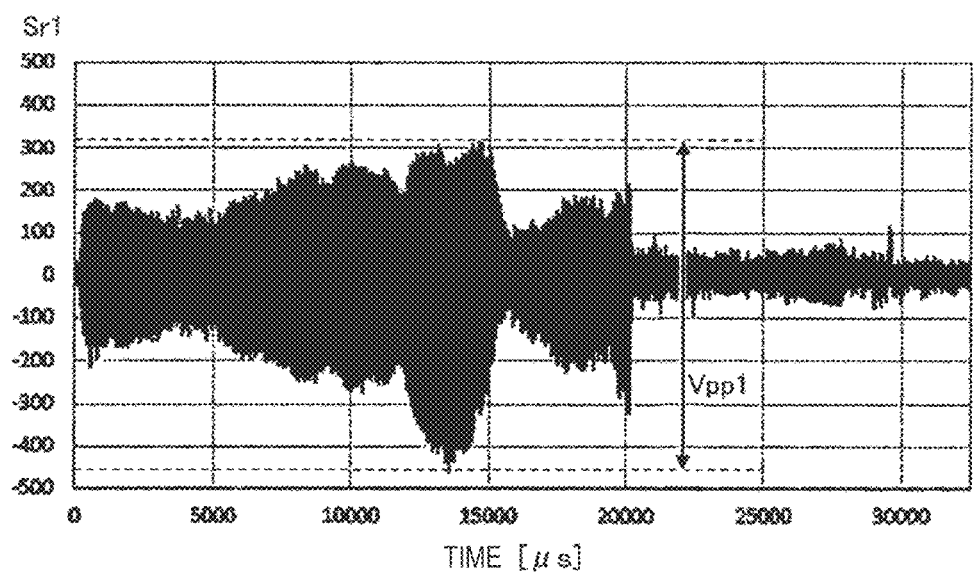
FIG. 22 illustrates another example of the waveform of the wave reception signal generated in the object detector at the time when the direct wave in the third frequency range is received.
Figure 23:
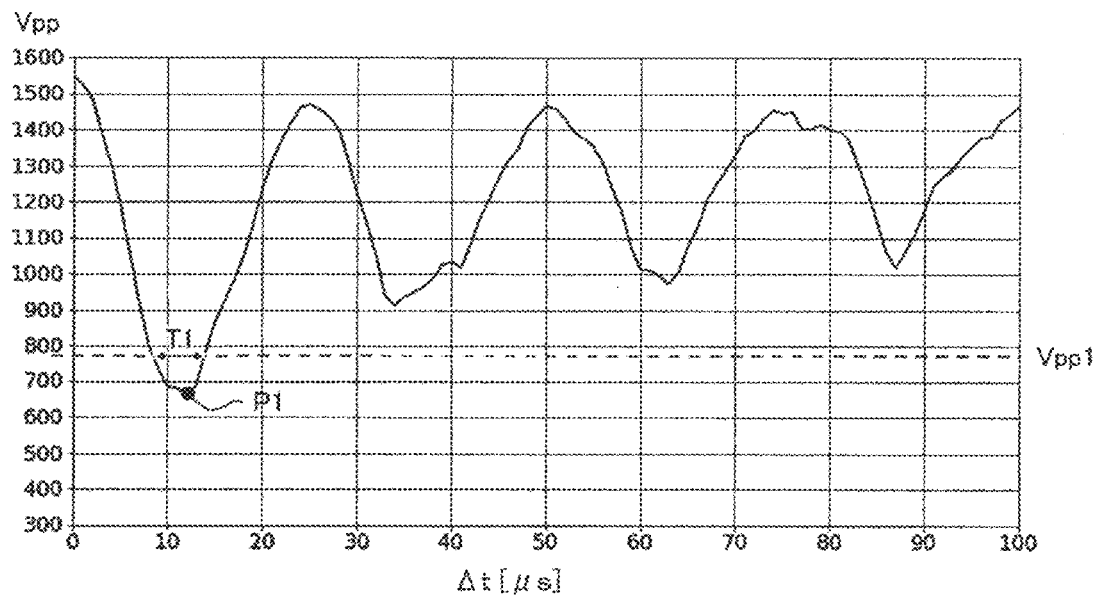
FIG. 23 illustrates the relationship between the shift time and the fluctuation range of a signal obtained by addition based on the wave reception signal in FIG. 22.

FIG. 22, which is analogous to FIG. 15, illustrates an example of the wave reception signal Sr1 generated at the time when the direct wave W0 in the third frequency range Fn is received by the wave receiver whose frequency characteristics are as illustrated in FIG. 17. FIG. 23, which is analogous to FIG. 16, illustrates the relationship between the shift time Δt and the fluctuation range Vpp of the signal obtained by the addition based on the wave reception signal Sr1 in FIG. 22. In this case, the minimum peak P1 is reached when the shift time Δt is 13 μs.

3. Conclusion

The object detector 1 according to the present example embodiment is capable of detecting the object 3 through transmission and reception of sound waves. The object detector 1 includes the wave transmitter 10, the first wave receiver 11a, the second wave receiver 11b, the wave-receiving circuit 16 (an example of the adder), and the controller 13. The wave transmitter 10 is configured to transmit the chirp wave W1 to the object 3. The chirp wave W1 is an example of a modulated wave in a predetermined frequency range. The first wave receiver 11a is configured to receive sound waves such as the echo W2 and the direct wave W0 and to generate the wave reception signal Sr1, which is a first wave reception signal indicative of the reception of the sound waves. The second wave receiver 11b is farther from the wave transmitter 10 than the first wave receiver 11a. The second wave receiver 11b is configured to receive sound waves and to generate the wave reception signal Sr2, which is a second wave reception signal indicative of the reception of the sound waves. The adder is configured to generate the wave reception signal Sr by adding the first wave reception signal and the second wave reception signal. The wave reception signal Sr is a third wave reception signal. The controller 13 is configured or programmed to detect the object 3 based on the third wave reception signal by causing the wave transmitter 10 to transmit the modulated wave. With the first wave receiver 11a and the second wave receiver 11b being arranged in a predetermined layout, the fluctuation range Vpp of the third wave reception signal generated upon receipt of the modulated wave from the wave transmitter 10 is not more than the fluctuation range Vpp1 of the first wave reception signal generated upon receipt of the modulated wave.

When the first wave receiver 11a and the second wave receiver 11b of the object detector 1 are arranged in the layout, the direct wave W0 transmitted by the wave transmitter 10 and received by the first wave receiver 11a and the second wave receiver 11b is offset in the wave reception signal Sr (the third wave reception signal) obtained by adding the wave reception signals Sr1 and Sr2. This results in a reduction in the influence of the direct wave W0 received directly by the object detector without being reflected off the object 3 that is to be detected through transmission and reception of sound waves.

The echo W2 is a wave reflected off the object 3. In the object detector 1, there may be no delays between the reception of the echo W2 via the first wave receiver 11a and the reception of the echo W2 via the second wave receiver 11b. This may lead to an increase in the proportion of the signal component corresponding to the echo W2 in the wave reception signal Sr obtained by addition. The object detector 1 according to the present example embodiment can thus achieve an increase in the signal component as well as a reduction in the noise component associated with the direct wave W0. Accordingly, the signal-to-noise ratio for object detection can be improved.

In the present example embodiment, the fluctuation range Vpp of the third wave reception signal generated upon receipt of the modulated wave alternately increases and decreases in accordance with the shift time $\Delta t$ corresponding to the distance difference do calculated by subtracting the distance d1 between the wave transmitter 10 and the first wave receiver 11a from the distance d2 between the wave transmitter 10 and the second wave receiver 11b (see, for example, FIG. 10). In one or more time periods T1, the fluctuation range Vpp changing with the shift time $\Delta t$ (or the distance difference do corresponding to the shift time $\Delta t$) is not more than the fluctuation range Vpp1 of the first wave reception signal. With the first wave receiver 11a and the second wave receiver 11b being arranged in the predetermined layout, the distance difference do is within a length of a section shorter than other section(s) into which the one or more time periods T1 are converted. This leads to a reduction in the size of the object detector 1 and enhances the ease of configuration of the object detector 1 while ensuring that the direct wave W0 is offset.

The first wave receiver 11a and the second wave receiver 11b in the present example embodiment have frequency characteristics in common with each other. This enables the first wave receiver 11a and the second wave receiver 11b to counter the direct wave W0 with ease.

The frequency range of the modulated wave transmitted by the wave transmitter 10 in the present example embodiment includes a first frequency (e.g., 80 kHz) and a second frequency (e.g., 60 KHz), where the sensitivity determined by the frequency characteristics of the wave receivers 11 is lower at the second frequency than at the first frequency (see FIG. 9). The object detector can easily reduce the influence of the direct wave W0 while using a wideband frequency-modulated wave, given that the frequency range of the modulated wave includes frequencies at which the sensitivity is relatively low.

The frequency range of the modulated wave in the present example embodiment may include, in addition to the first and second frequencies, a third frequency (e.g., 41 kHz) that is above one-half of the first frequency and is lower than the first frequency. In a case where the frequency range of the modulated wave is excessively broadened, some of the frequency components of the direct wave W0 may be offset. However, there is a possibility that the other frequency components might reinforce each other. Meanwhile, there is little possibility of mutual reinforcement of frequency components between the first frequency and the third frequency reinforce. This provides ease of reducing the influence of the direct wave W0.

The controller 13 in the present example embodiment yields a cross-correlation function for detection of the object 3 by performing arithmetic computations based on the third wave reception signal and the wave transmission signal Sd for causing the wave transmitter 10 to transmit the modulated wave (see FIG. 5). Although the object detection method based on the cross-correlation processing may involve the use of an extended time period during which the wave receivers 11 receive sound waves, the object detector 1 according to the present example embodiment can reduce the influence of the direct wave W0.

The wave transmitter 10 in the present example embodiment includes a thermophone that is configured to transmit the modulated wave by causing intermittent heating. The thermophone can transmit a wideband frequency-modulated wave and can thus enhance ease of object detection.

Example Embodiment 2

The object detector 1 according to Example Embodiment 1 includes the two wave receivers respectively denoted by 11a and 11b. In some example embodiments, however, the object detector 1 includes three or more wave receivers 11. Example Embodiment 2, which is a variation of Example Embodiment 1, is described below with reference to FIG. 24.

Figure 24:
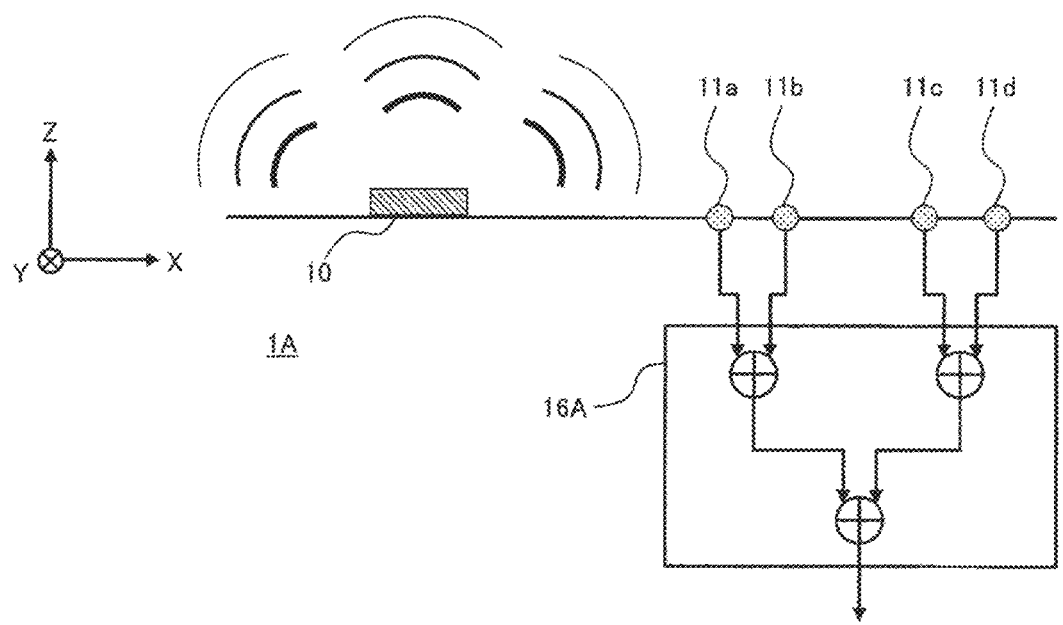
FIG. 24 is an explanatory diagram of an object detector according to Example Embodiment 2 of the present invention.

FIG. 24 illustrates an example layout of a wave transmitter 10 and wave receivers 11 of an object detector 1A according to Example Embodiment 2. For example, the object detector 1A in the present example embodiment includes four wave receivers, which are denoted by 11a, 11b, 11c, and 11d, respectively. The object detector 1A is otherwise structurally similar to the object detector 1 according to Example Embodiment 1. Referring to FIG. 24, the object detector 1A includes a wave-receiving circuit 16A, which includes an adder configured to add wave reception signals from a pair of wave receivers (e.g., the wave receivers 11a and 11b), an adder configured to add wave reception signals from another pair of wave receivers (e.g., the wave receivers 11c and 11d), and an adder configured to add two wave reception signals obtained as a result of additions performed by the respective pairs of wave receivers.

With two pairs of wave receivers being included in the object detector 1A, the distance difference for each pair of wave receivers (i.e., for the wave receivers 11a and 11b and for the wave receivers 11c and 11d) is optimized in the manner described above to offset the direct wave W0. In addition, the distance difference for the two pairs of wave receivers (i.e., the wave receivers 11a to 11d) may be optimized. The optimization of the layout of the wave receivers 11a to 11d enables a further reduction in the influence of the direct wave W0.

The number of wave receivers 11 of the object detector 1A according to the present example embodiment may be increased. Given that the number of wave receivers 11 is expressed as $2n$, the layouts of pairs each including two wave receivers 11 may be sequentially optimized in the manner described above. Alternatively, the optimization may be performed to the extent that each pair including two wave receivers 11 of the object detector 1A can counter the direct wave W0.

As mentioned above, the object detector 1A according to the present example embodiment includes, in addition to the first wave receiver 11a and the second wave receiver 11b, one or more third wave receivers (the wave receivers 11c and 11d) spaced apart from the first wave receiver 11a and the second wave receiver 11b. The wave-receiving circuit 16A, which is an adder, is configured to generate a third wave reception signal by adding wave reception signals from the first to third wave receivers (i.e., the wave receivers 11a to 11d). The use of a multitude of wave receivers 11 enables an increase in the signal component of the echo W2 as well as a decrease in the influence of the direct wave W0 and can thus enhance ease of object detection.

Other Example Embodiments

The object detector 1 according to Example Embodiment 1 and the object detector 1A according to Example Embodiment 2 each include wave receivers 11 that are adjacent to each other. Nevertheless, it is not required that the wave receivers 11 be arranged in this layout. In light of this, a variation of the object detector 1 is described below with reference to FIG. 25.

Figure 25:
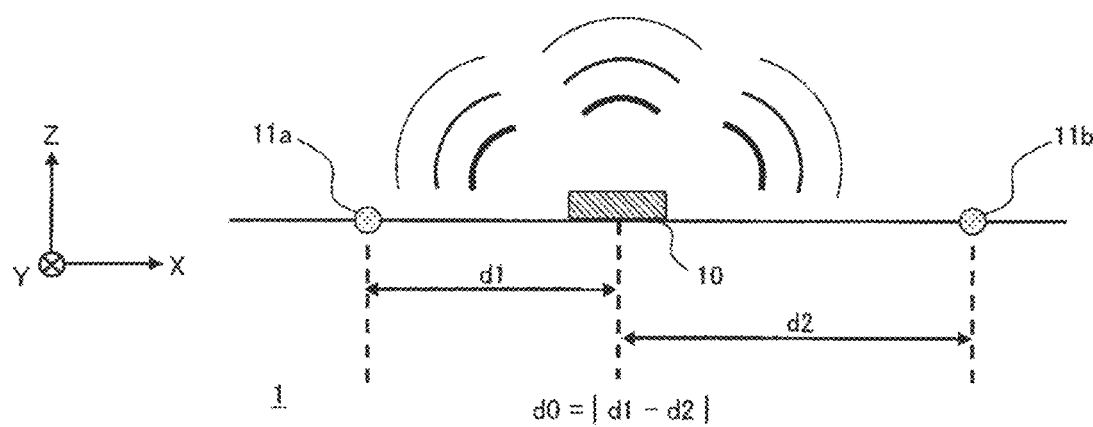
FIG. 25 is an explanatory diagram of Variation 1 of the object detector according to Example Embodiment 1 of the present invention.

FIG. 25 illustrates an example layout of the wave transmitter 10 and the wave receivers 11 of the variation of the object detector 1. It is not required that the wave receivers 11a and 11b of the object detector 1 be arranged on one side of the wave transmitter 10. Referring to FIG. 25, the first wave receiver 11a and the second wave receiver 11b are disposed on the −X side and the +X side, respectively, of the wave transmitter 10. That is, the first wave receiver and the second wave receiver 11b may be disposed on opposite sides with the wave transmitter 10 located therebetween. It is not required that the wave transmitter 10 and the wave receivers 11a and 11b be disposed on the same straight line. The angle formed by the wave transmitter 10 and each of the wave receivers 11a and 11b may be set as appropriate between the X direction and the Y direction.

When the first wave receiver 11a and the second wave receiver 11b are arranged in such a layout, the distance difference do for the first wave receiver 11a and the second wave receiver 11b may still be defined as the value calculated by subtracting the distance d1 between the wave transmitter 10 and the first wave receiver 11a from the distance d2 between the wave transmitter 10 and the second wave receiver 11b. The distance difference do is set in accordance with the shift time Δt selected through the optimization described above. Thus, the layout of the wave receivers 11a and 11b can be adjusted as appropriate while it is ensured that the distance difference do does not deviate from the set value.

The wave transmitter 10 and the wave receivers 11 of the object detector 1 according to the example embodiments described above are disposed on the same plane. Nevertheless, it is not required that wave transmitter 10 and the wave receivers 11 be disposed on the same plane. In light of this, another variation of the object detector 1 is described below with reference to FIG. 26.

Figure 26:
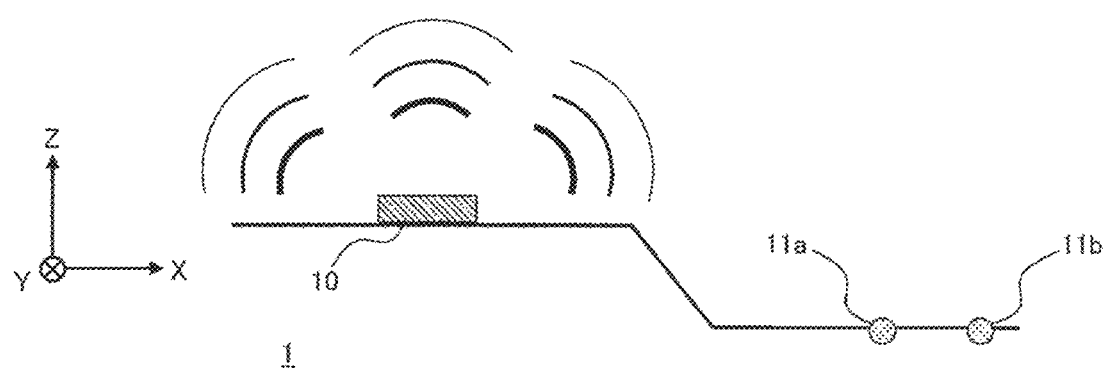
FIG. 26 is an explanatory diagram of Variation 2 of the object detector according to Example Embodiment 1 of the present invention.

FIG. 26 illustrates an example layout of the wave transmitter 10 and the wave receivers 11 of the variation of the object detector 1. The wave receivers 11a and 11b of the variation of the object detector 1 are not in positional agreement with the wave transmitter 10 in the Z direction. The variation of the object detector 1 is otherwise structurally similar to the object detector 1 according to Example Embodiment 1. For example, the wave transmitter 10 is disposed on the +Z side, and the wave receivers 11a and 11b are disposed on the −Z side, with the wave transmitter 10 being oriented toward the object 3 in the X direction. In this case, the wave receivers 11a and 11b receive a smaller proportion of the direct wave W0 from the wave transmitter 10.

Although the object detector 1 according to each of the example embodiments described above performs arithmetic computations for object detection by using a complex-valued cross-correlation function, the object detector 1 may perform arithmetic computations in different manners. That is, the object detector 1 according to the present example embodiment may perform arithmetic computations without using such a complex-valued cross-correlation function. For example, the controller 13 of the object detector 1 may compute the distance between the object detector 1 and the object 3 by determining the peak of the signal I regarded as the real part, instead of determining the peak of the envelope E(t). In such a case, the Hilbert transform module 133 and its subsequent stage, namely, the IFFT module 134b in the functional configuration of the controller 13 are optional.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An object detector capable of detecting an object through transmission and reception of sound waves, the object detector comprising:
   a wave transmitter to transmit a modulated wave in a predetermined frequency range to an object;
   a first wave receiver to receive sound waves and to generate a first wave reception signal indicative of reception of the sound waves;
   a second wave receiver to receive sound waves and to generate a second wave reception signal indicative of reception of the sound waves, the second wave receiver being located farther from the wave transmitter than the first wave receiver;
   an adder to generate a third wave reception signal by adding the first wave reception signal and the second wave reception signal; and
   a controller to detect the object based on the third wave reception signal by causing the wave transmitter to transmit the modulated wave; wherein
   with the first and second wave receivers being arranged in a predetermined layout, a fluctuation range of the third wave reception signal generated upon receipt of the modulated wave from the wave transmitter is not more than a fluctuation range of the first wave reception signal generated upon receipt of the modulated wave.

2. The object detector according to claim 1, wherein
   the fluctuation range of the third wave reception signal generated upon receipt of the modulated wave alternately increases and decreases in accordance with a distance difference calculated by subtracting a distance between the wave transmitter and the first wave receiver from a distance between the wave transmitter and the second wave receiver;
   the fluctuation range corresponding to one or more sections concerning the distance difference is not more than the fluctuation range of the first wave reception signal; and
   with the first and second wave receivers being arranged in the predetermined layout, the distance difference is within a length of one of the one or more sections that is shorter than at least one other of the one or more sections.

3. The object detector according to claim 1, wherein the first wave receiver and the second wave receiver have frequency characteristics in common with each other.

4. The object detector according to claim 3, wherein a frequency range of the modulated wave includes a first frequency and a second frequency, where sensitivity determined by the frequency characteristics is lower at the second frequency than at the first frequency.

5. The object detector according to claim 4, wherein the frequency range of the modulated wave includes, in addition to the first and second frequencies, a third frequency that is above the first frequency and is lower than twice the first frequency.

6. The object detector according to claim 1, further comprising one or more third wave receivers spaced from the first wave receiver and the second wave receiver; wherein
the adder is operable to generate the third wave reception signal by adding wave reception signals from the first to third wave receivers.

7. The object detector according to claim 1, wherein the controller is configured or programmed to yield a cross-correlation function for detection of the object by performing arithmetic computations based on the third wave reception signal and a transmission signal to cause the wave transmitter to transmit the modulated wave.

8. The object detector according to claim 1, wherein the wave transmitter includes a thermophone to transmit the modulated wave by causing intermittent heating.

9. The object detector according to claim 1, wherein the wave transmitter includes a piezoelectric resonant ultrasonic transducer.

10. The object detector according to claim 1, wherein the modulated wave is a chirp wave modulated with a predetermined frequency range.

11. The object detector according to claim 10, wherein the frequency of the chirp wave is linearly decreased over time.

12. The object detector according to claim 1, wherein the modulated wave is modulated using pulse-interval modulation or pulse-width modulation or amplitude modulation.

13. The object detector according to claim 1, wherein the wave transmitter includes a switching transistor, a capacitor, and an inductor.

14. The object detector according to claim 1, wherein the first wave receiver or the second wave receiver includes a microphone.

15. The object detector according to claim 1, wherein the controller includes at least one of a microcomputer, an electronic circuit, or hardware circuitry.

16. The object detector according to claim 1, wherein the controller includes at least one of an analog-to-digital converter or a digital-to-analog converter.

17. The object detector according to claim 1, wherein the controller includes at least one of a fast Fourier transform module, a cross-spectrum calculation module, a Hilbert transform module, an inverse fast Fourier transform module, or an analysis processing module.

18. The object detector according to claim 1, wherein the controller is configured or programmed to execute programs stored in a storage.

19. The object detector according to claim 1, wherein three or more waive receivers are provided.

20. The object detector according to claim 19, wherein two or more adders are provided.

* * * * *